US011532245B2

(12) United States Patent
Klappert et al.

(10) Patent No.: US 11,532,245 B2
(45) Date of Patent: Dec. 20, 2022

(54) TECHNICAL SOLUTIONS FOR CUSTOMIZED TOURS

(71) Applicant: Warner Bros. Entertainment Inc., Burbank, CA (US)

(72) Inventors: Walter Klappert, North Hollywood, CA (US); Daniel Ferguson, Los Angeles, CA (US)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 697 days.

(21) Appl. No.: 16/589,735

(22) Filed: Oct. 1, 2019

(65) Prior Publication Data

US 2021/0097893 A1 Apr. 1, 2021

(51) Int. Cl.
*G09B 29/00* (2006.01)
*G06Q 50/14* (2012.01)
*G06Q 10/04* (2012.01)
*G06F 16/901* (2019.01)
*G06N 20/00* (2019.01)

(52) U.S. Cl.
CPC ....... *G09B 29/008* (2013.01); *G06F 16/9024* (2019.01); *G06N 20/00* (2019.01); *G06Q 10/047* (2013.01); *G06Q 50/14* (2013.01)

(58) Field of Classification Search
CPC .. G09B 29/008; G06F 16/9024; G06N 20/00; G06Q 10/047; G06Q 50/14; G06Q 10/02
See application file for complete search history.

(56) References Cited

FOREIGN PATENT DOCUMENTS

WO    WO 2019/068025 A1    4/2019

OTHER PUBLICATIONS

"Five Most Popular Similarity Measures Implementation in Python", retrieved from http://dataaspirant.com/2015/04/11/five-most-popular-similarity-measures-implementation-in-python/, 2015, pp. 1-13.
"The Field Trip to Mars" retrieved from http://framestorevr.com/field-trip-to-mars, 2016, pp. 1-5.
"Aggregating functions", retrieved from https://neo4j.com/docs/cypher-manual/current/functions/aggregating/index.html, pp. 1-22.

*Primary Examiner* — Pei Yong Weng
(74) *Attorney, Agent, or Firm* — One LLP

(57) ABSTRACT

An apparatus and method for configuring a customized tour includes providing a list of tour subject indicators with a relevance value for locations to be toured, receiving user selection data regarding the subject indicators, and configuring a tour route based on an aggregate relevance score calculated for the tour subject indicators and locations indicated by one or more users. The method and apparatus may further include defining at least one tour route record comprising an ordered list of locations that satisfies at least a minimum aggregate relevance score constraint and a maximum tour duration constraint and saving information defining the at least one tour route record in a computer memory for use in delivering a corresponding tour.

41 Claims, 18 Drawing Sheets

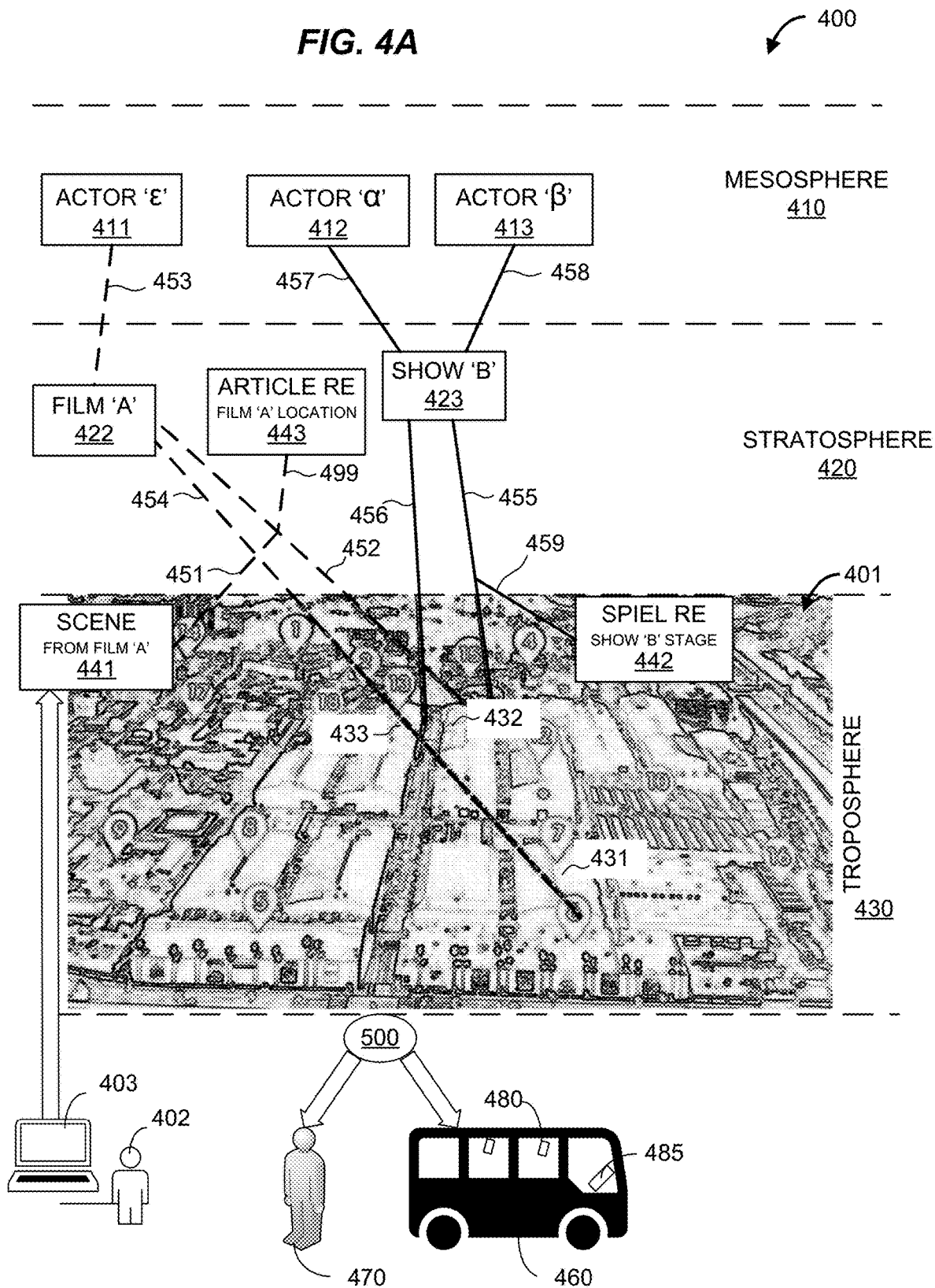

Tour Route Records 600

Routes #1, etc.

| Tour Subject | A | B | ... | n |
|---|---|---|---|---|
| Location | X1 | X2 | ... | Xn |
| Content | media a, script aa | media b, script bb | ... | media n, script nn |
| Duration (min) | 15 | 10 | ... | 5 |
| Grade | 96 | 97 | ... | N |
| Current Accessibility | Y | N | ... | Y/N |

⋮

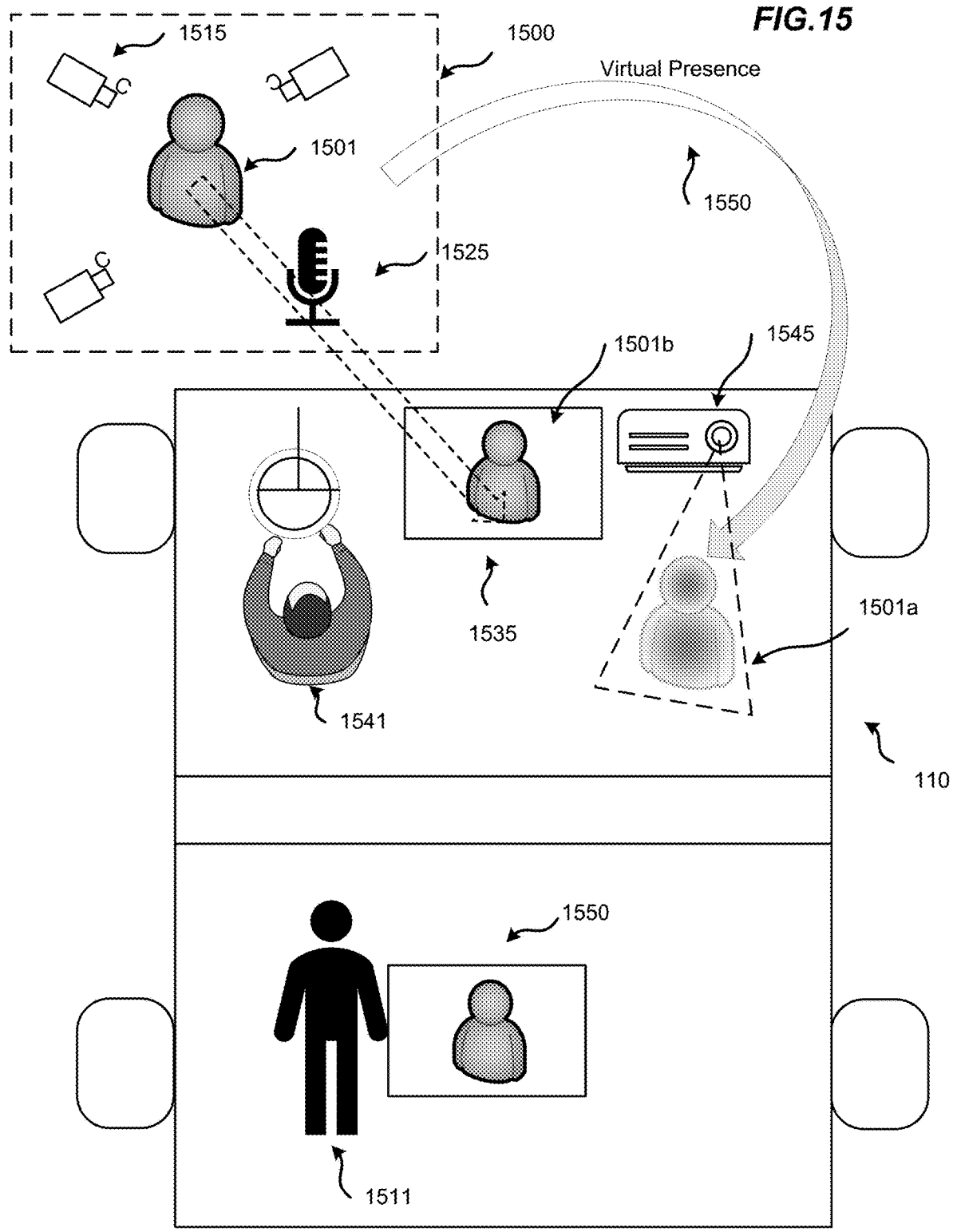

┌─ 1610
PROVIDING, BY ONE OR MORE PROCESSORS, AN ORDERED ARRANGEMENT OF TOUR SUBJECT INDICATORS CONFIGURED FOR OUTPUT BY A USER INTERFACE DEVICE, WHEREIN EACH OF THE TOUR SUBJECT INDICATORS IS ASSOCIATED BY AN ELECTRONIC DATA STRUCTURE TO A RELEVANCE VALUE FOR ONE OR MORE LOCATIONS OF THE MAPPED SPACE AND TO CONTENT ABOUT A SUBJECT INDICATED BY THE TOUR SUBJECT INDICATOR FOR DELIVERY AT CORRESPONDING ONES OF THE ONE OR MORE LOCATIONS, WHEREIN THE RELEVANCE VALUE INDICATES A DEGREE OF RELEVANCE OF EACH LOCATION OF THE ONE OR MORE LOCATIONS TO THE EACH OF THE TOUR SUBJECTS

┌─ 1620
RECEIVING, BY THE ONE OR MORE PROCESSORS FROM THE USER INTERFACE DEVICE, USER SELECTION DATA FROM A USER INDICATING A LESSER SUBSET SELECTED FROM THE ORDERED ARRANGEMENT OF TOUR SUBJECT INDICATORS

┌─ 1630
CALCULATING, BY THE ONE OR MORE PROCESSORS, AN AGGREGATE RELEVANCE SCORE FOR THE LESSER SUBSET OF TOUR SUBJECT INDICATORS AND LOCATIONS OF THE MAPPED SPACE

┌─ 1640
DEFINING, BY THE ONE OR MORE PROCESSORS, AT LEAST ONE TOUR ROUTE RECORD COMPRISING AN ORDERED LIST OF LOCATIONS BEING A LESSER SUBSET OF ALL LOCATIONS IN THE MAPPED SPACE THAT SATISFIES AT LEAST A MINIMUM AGGREGATE RELEVANCE SCORE CONSTRAINT AND A MAXIMUM TOUR DURATION CONSTRAINT

┌─ 1650
SAVING INFORMATION DEFINING THE AT LEAST ONE TOUR ROUTE RECORD IN A COMPUTER MEMORY FOR USE IN DELIVERING A CORRESPONDING TOUR

```
┌─────────────────────────────────────────────────────────┐
│ WHEREIN THE CALCULATING FURTHER COMPRISES               │
│ AGGREGATING EDGE VALUES OF A GRAPH DATABASE LINKING     │──1710
│ THE LESSER SUBSET OF TOUR SUBJECT INDICATORS TO THE     │
│ LOCATIONS OF THE MAPPED SPACE, WHEREIN NODES OF THE     │
│ GRAPH COMPRISE THE TOUR SUBJECT INDICATORS              │
└─────────────────────────────────────────────────────────┘
                            │
                            ▼
┌─────────────────────────────────────────────────────────┐
│ BY THE ONE OR MORE PROCESSORS, CALCULATING AN           │
│ ESTIMATED TOUR DURATION BASED ON THE ORDERED LIST OF    │──1720
│ LOCATIONS, AT LEAST IN PART BY SUMMING ESTIMATED        │
│ TRANSIT TIMES BETWEEN EACH LOCATION AND ESTIMATED       │
│ LINGER TIMES AT EACH LOCATION                           │
└─────────────────────────────────────────────────────────┘
                            │
                            ▼
┌─────────────────────────────────────────────────────────┐
│ ESTIMATING, BY THE ONE OR MORE PROCESSORS, THE          │
│ ESTIMATED LINGER TIMES AT THE EACH LOCATION AT LEAST IN │──1730
│ PART BASED ON A PREDETERMINED DELIVERY PERIOD FOR THE   │
│ CONTENT FOR DELIVERY AT THE EACH LOCATION               │
└─────────────────────────────────────────────────────────┘
                            │
                            ▼
┌─────────────────────────────────────────────────────────┐
│ WHEREIN THE DEFINING FURTHER COMPRISES THE              │
│ CALCULATING THE AGGREGATE RELEVANCE SCORE FOR EACH      │──1740
│ OF ALTERNATIVE TOUR ROUTES SATISFYING THE MINIMUM       │
│ AGGREGATE RELEVANCE SCORE CONSTRAINT AND THE            │
│ MAXIMUM TOUR DURATION                                   │
└─────────────────────────────────────────────────────────┘
                            │
                            ▼
┌─────────────────────────────────────────────────────────┐
│ SELECTING, BY THE ONE OR MORE PROCESSORS, A SELECTED    │──1750
│ ROUTE FROM THE ALTERNATIVE TOUR ROUTES BASED ON THE     │
│ SELECTED ROUTE HAVING A GREATEST OF AGGREGATE           │
│ RELEVANCE SCORES DETERMINED BY THE CALCULATING          │
└─────────────────────────────────────────────────────────┘
```

2002 — COMPONENT FOR PROVIDING AN ORDERED ARRANGEMENT OF TOUR SUBJECT INDICATORS CONFIGURED FOR OUTPUT BY A USER INTERFACE DEVICE, WHEREIN EACH OF THE TOUR SUBJECT INDICATORS IS ASSOCIATED BY AN ELECTRONIC DATA STRUCTURE TO A RELEVANCE VALUE FOR ONE OR MORE LOCATIONS OF THE MAPPED SPACE AND TO CONTENT ABOUT A SUBJECT INDICATED BY THE TOUR SUBJECT INDICATOR FOR DELIVERY AT CORRESPONDING ONES OF THE ONE OR MORE LOCATIONS, WHEREIN THE RELEVANCE VALUE INDICATES A DEGREE OF RELEVANCE OF EACH LOCATION OF THE ONE OR MORE LOCATIONS TO THE EACH OF THE TOUR SUBJECTS

2003 — COMPONENT FOR RECEIVING FROM THE USER INTERFACE DEVICE, USER SELECTION DATA FROM A USER INDICATING A LESSER SUBSET SELECTED FROM THE ORDERED ARRANGEMENT OF TOUR SUBJECT INDICATORS

2004 — COMPONENT FOR CALCULATING AN AGGREGATE RELEVANCE SCORE FOR THE LESSER SUBSET OF TOUR SUBJECT INDICATORS AND LOCATIONS OF THE MAPPED SPACE

2005 — COMPONENT FOR DEFINING AT LEAST ONE TOUR ROUTE RECORD COMPRISING AN ORDERED LIST OF LOCATIONS BEING A LESSER SUBSET OF ALL LOCATIONS IN THE MAPPED SPACE THAT SATISFIES AT LEAST A MINIMUM AGGREGATE RELEVANCE SCORE CONSTRAINT AND A MAXIMUM TOUR DURATION CONSTRAINT

2006 — COMPONENT FOR SAVING INFORMATION DEFINING THE AT LEAST ONE TOUR ROUTE RECORD IN A COMPUTER MEMORY FOR USE IN DELIVERING A CORRESPONDING TOUR

2010 — PROCESSOR
2014 — BIOMETRIC SENSOR
2011 — NETWORK INTERFACE
2012 — OUTPUT PORT
2016 — MEMORY

TECHNICAL SOLUTIONS FOR CUSTOMIZED TOURS

FIELD

The present disclosure relates to methods, systems, apparatus for configuring customized tours.

BACKGROUND

Places of historical or popular interest attract visitors interested in relating their knowledge of relevant topics to specific exhibits or portions of the attraction while learning more about what they are seeing. Visitors often have trouble understanding the significance of what they are experiencing during a tour to the relevant topics of interest. For example, without guidance it is difficult for visitors to a production studio lot to understand which portions of the lot are relevant to what the visitor is most interested in, for example, things that relate to specific actors or movie titles. To help visitors understand the significance of their tour experience, tourist often hire tour guides, either directly or through a site manager.

Various methods are used to plan navigation and accompanying information for guided or self-guided tours. For example, a tour planner might develop a single tour for all visitors, or several different tours from which visitors can select their preference. In self-guided tours, locating methods can be combined with a library of content to play content most relevant to the visitor's current location. This approach can work well to allow customization of self-guided tours for spaces such as museums, in which each exhibit relates to a single subject, e.g., a certain work of art or artifact. It does not work as well for attractions in which the same location or object relates to many different topics of interest, or in which the conditions of the tour site are not suitable for self-guided touring.

For example, most locations in production studio lots have been used for many different titles starring even more actors over the years. Each visitor may be interested in learning more about different titles or lots. In addition, because studio lots are still used for current production, tour operators cannot allow visitors to go about unsupervised. Also, operators usually perform tours for groups and not individuals, to keep tours more affordable. Thus, visitors to studio lots and similar destinations are often limited to joining a group that follows a predetermined path and script that is not customized for the interests of individual visitors. Connoisseurs of classic movies are grouped with lovers of soap operas, action-adventure movies, horror films, and all manner of other content produced at the studio over the years. Consequently, most visitors can learn a little about different topics but less about the topics they are most interested in.

It would be desirable, therefore, to develop new methods and other new technologies for configuring customized tours that overcomes these and other limitations of the prior art.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a computer-implemented method for configuring a customized tour of a mapped space for a person, group or cohort may include providing, by one or more processors, an ordered arrangement of tour subject indicators configured for output by a user interface device. As used herein, a "tour subject indicator" is a digital identifier for content relating to a subject and to a place or object including in a tour. A "user interface device" may refer to a computing apparatus or system comprising a processor or cooperating processors configured with executable instructions and components for receiving digital inputs from user input devices and sensors, processing the digital input determining therefrom a digital output from a store of media components, e.g., video, audio, and other data configured for producing human-perceptible output. Examples include a smartphone (mobile client device), a tablet, a portable computer, a digital streaming player, a smart TV player, a network media player, OTT player, a system of mobile smart devices and a local or remote server, an augmented reality (AR)/virtual reality (VR) headset, or other computing apparatus that produces human-perceivable output and can receive user input. A "processor" or "processors" refers to a hardware processor or processors as used in computing apparatus, for example a semiconductor device. In an aspect, each of the tour subject indicators may be associated by an electronic data structure to a relevance value for one or more locations of the mapped space and to content about a subject indicated by the tour subject indicator for delivery at corresponding ones of the one or more locations. In some aspect, the relevance value may indicate a degree of relevance of each location of the one or more locations to the each of the tour subjects.

The method may further include receiving, by the one or more processors from the user interface device, user selection data from a user indicating a lesser subset selected from the ordered arrangement of tour subject indicators.

The method may further include calculating, by the one or more processors, an aggregate relevance score for the lesser subset of tour subject indicators and locations of the mapped space.

The method may further include defining, by the one or more processors, at least one tour route record comprising an ordered list of locations being a lesser subset of all locations in the mapped space that satisfies at least a minimum aggregate relevance score constraint and a maximum tour duration constraint.

The method may further include saving information defining the at least one tour route record in a hardware (e.g., electronic, optical, or magnetic) memory for use in delivering a corresponding tour.

In an aspect, the calculating may further include aggregating edge values of a graph database linking the lesser subset of tour subject indicators to the locations of the mapped space, wherein nodes of the graph comprise the tour subject indicators.

In an aspect, the method may further include, by the one or more processors, calculating an estimated tour duration based on the ordered list of locations, at least in part by summing estimated transit times between each location and estimated linger times at each location. For example, in an aspect, the method may further include estimating, by the one or more processors, the estimated linger times at the each location at least in part based on a predetermined delivery period for the content for delivery at the each location.

In an aspect, the defining may further include the calculating the aggregate relevance score for each of alternative tour routes satisfying the minimum aggregate relevance score constraint and the maximum tour duration. For example, in an aspect, the method may further include selecting, by the one or more processors, a selected route from the alternative tour routes based on the selected route having a greatest of aggregate relevance scores determined by the calculating.

In an aspect, the defining may further include generating the ordered list of locations in part by eliminating candidate locations for periods during which the candidate location is indicated as unavailable. For example, the method may further include calculating, by the one or more processors, periods during which the candidate location is unavailable at least in part based on scheduled use of the location by one or more prior tours.

In an aspect, the method may further include by the one or more processors for each of the tour subject indicators, weighting the relevance value by an interest factor indicating a user's level of interest in the indicated subject. For example, in an aspect, the method may further include by the one or more processors, determining the interest factor based on one or more of user input, prior user feedback for a cohort matching the user, or electronic data indicating user preferences. In an aspect, the method may further include modifying the at least one tour record during the tour, based at least in part on the user feedback. In various implementations, modifying the at least one tour record during the tour can be accomplished in real time (e.g., in less than or equal to 1 minute, in less than or equal to 5 minutes, or in less than or equal to 10 minutes). In another aspect, the method may further include receiving at least a portion of the user feedback as biometric data indicating a neurological response of the user to delivery of the content, from a biometric sensor positioned to detect the neurological response. In another aspect, the method may further include, by the one or more processors, adjusting at least one of the relevance value or interest factor based on user feedback received during or after completing at least a portion of a tour following the tour route record. In another aspect, the method may further include tracking, by the one or more processors, progress of the user along the tour, at least in part by receiving a signal from a wireless transmitter progressing through the tour with the user. In another aspect, the method may further include, by the one or more processors, processing the user feedback by a machine-learning algorithm trained to predict at least one of the interest factor or the relevance value for specific user cohorts.

In an aspect, the method may further include generating an electronic tour guide for content corresponding to locations indicated by the at least one tour route record relevant to subjects referenced by the lesser subset selected from the ordered arrangement of tour subject indicators. For example, the method may further include providing the electronic tour guide to at least one of a mobile device belonging to the user, or a mobile device belonging to a tour guide. As another example, the method may further include providing the electronic tour guide to one or more electronic processor included in a vehicle, a media cart or a wearable electronic device (e.g., a watch, a display device, a headset, etc.).

In another aspect, the method may further include combining, by the one or more processors, two or more lesser subsets selected from the ordered arrangement of tour subject indicators each corresponding to a different user. For example, the method may further include, by the one or more processors, selecting the two or more lesser subsets based on a similarity measure exceeding a threshold value. In another aspect, the method may further include, by the one or more processors, prioritizing tour subject indicators in the two or more lesser subsets for including in the at least one tour route record, at least in part by an algorithm that includes an equal number of unique tour subject indicators for each participating user.

The foregoing method may be implemented in any suitable programmable computing apparatus coupled to an output device such as a video player, by provided program instructions in a non-transitory computer-readable medium that, when executed by one or more processors (hereinafter collectively or individually may be referred to as "processor"), cause the apparatus to perform the described operations. The processor may be local to the apparatus and user, located remotely, or may include a combination of local and remote processors. An apparatus may include a computer or set of connected computers installed in a vehicle, or portable devices (e.g., smartphones or notepad computers) coupled to a node or network via an access point in a vehicle or otherwise linked to a vehicle for a specific tour. The user interface device may include, for example, a personal computer, mobile phone, notepad computer, projector, haptic interface, scent dispenser, virtual reality device, augmented reality device, or any combination thereof. In some implementations, the user interface device may include hardware elements or configurations located on or in a vehicle, for example: a 4D film presentation system and/or any of its components, such as a motion generating system or moving seat, e.g., D-BOX seats by D-BOX Technologies Inc. (Canada) or MX4D® theatre seats by MediaMation, Inc. (Torrance, Calif.); a noise cancellation technology such as Quiet Bubble™ by Silentium Ltd. (Israel); mixed reality gears and equipments, e.g., a VR vest such as KOR-FX by Immerz, Inc. (Cambridge, Mass.); a display screen configuration including one or more displays, tactile gear/interface, olfactory interface, haptic devices, pneumatic devices, hydraulic devices, motorized devices, a port to a mobile phone, or the like.

As used herein, "media cart" or "vehicle" is defined as a movable physical body or structure that may house one or more persons including a passenger/user, and/or a tour guide as defined herein, for example, an autonomous vehicle; a transportation vessel such as a tour bus, tram, elevator, taxi, airplane, bus, etc.; an amusement ride; a kiosk; a house (e.g., a motorhome, a camper, or a traditional home); a mobile office space (mobile or otherwise), and the like, that may or may not be associated per se with transportation of people. As used in the present disclosure, connected vehicles may be referred to simply as vehicles and may include various suitable types of vehicles, whether driven autonomously or driven by a person.

Other elements of the apparatus may include, for example, an audio output device and a user input device, which participate in the execution of the method. An apparatus may include, or may couple to, a virtual or augmented reality device (including xR mixed reality output devices that may include augmented and virtual reality outputs), such as a headset or other display that reacts to movements of a user's head and other body parts. The apparatus may include, or may couple to, biometric sensors that provide data used by a controller to control details of the content about the tour subjects.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 4A is a schematic diagram showing illustrative features of a portion of a graph database, and interactions of a user with aspects of a system and apparatus for configuring a customized tour of a mapped space, in accordance with some embodiments of the disclosure.

FIG. 15 is a schematic diagram showing features of an apparatus for configuring a customized tour of a mapped space, showing example aspects of an electronic tour guide in accordance with some embodiments.

FIG. 16 is a flow chart illustrating aspects of a method for configuring a customized tour of a mapped space.

FIGS. 17-19 are flow charts illustrating further optional aspects or operations of the method diagrammed in FIG. 16.

FIG. 20 is a conceptual block diagram illustrating components of an apparatus or system for configuring a customized tour of a mapped space.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form to facilitate describing these aspects.

Figure 1:
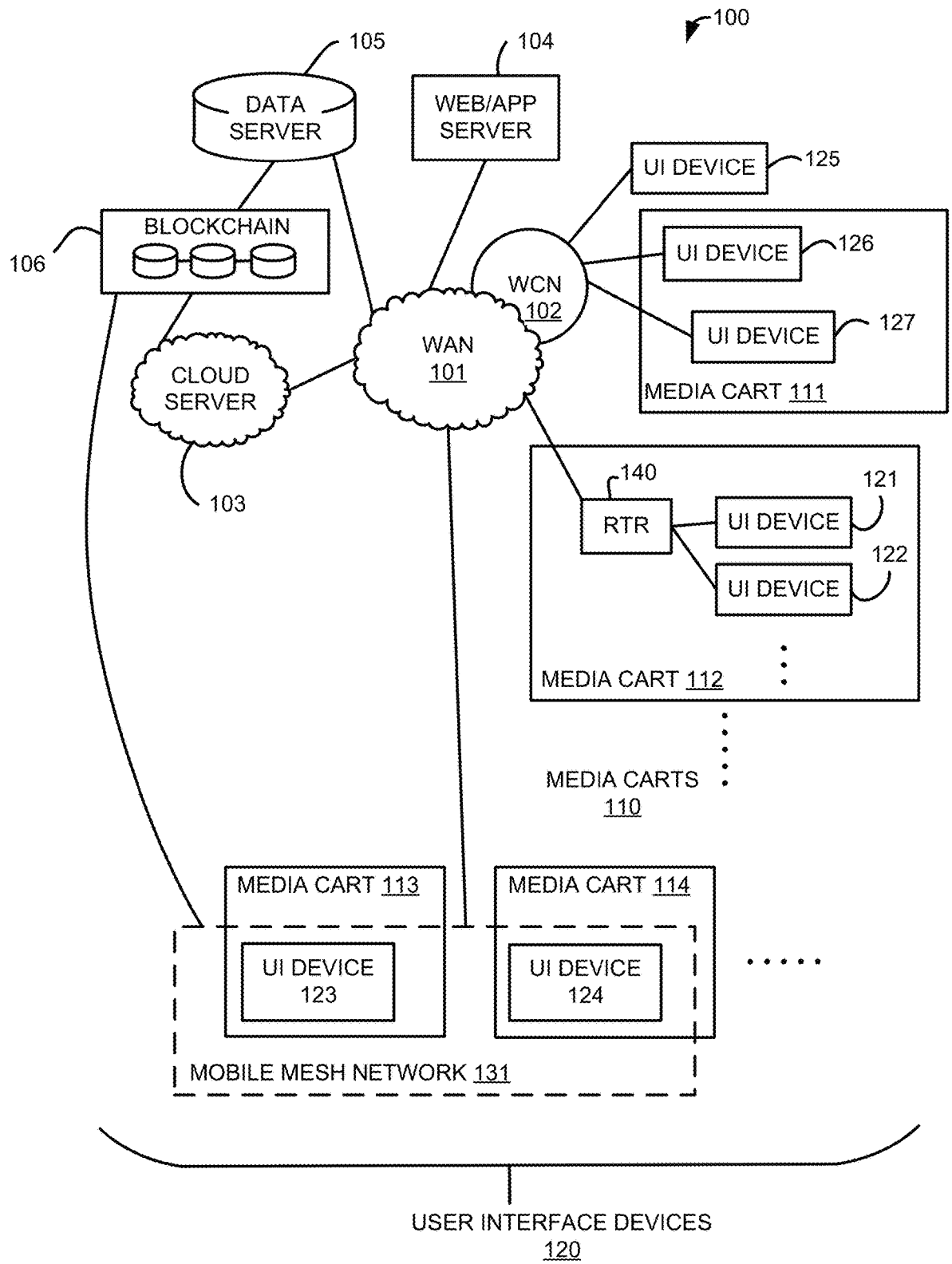
FIG. 1 is a schematic block diagram illustrating aspects of a system and apparatus for configuring a customized tour of a mapped space.

FIG. 1 illustrates aspects of an exemplary environment 100 in which a system and apparatus for configuring a customized tour of a mapped space may operate. A mapped space may include a physical space in the real world, or a virtual space in a virtual reality world, or a combination of both in the case of augmented reality world. One or more locations in the mapped space may include objects, items, stores, restaurants, buildings, landscape, landmark, film studios, filming locations, etc., appearing or represented in the mapped space. The method allows for configuring tour routes including locations and contents about tour subjects for single users or multiple members of a tour group in shared space (media cart) or tandem tours (separate tour groups running together), in the user interface device-server environment 100. Other architectures may also be suitable.

The methods may include using user selection data for one or more users to define at least one tour route record. User selection data may include, for example, selections made by a user via a user interface, defining subjects or locations of interest to the user. The user interface may present options for selection by a user and receive the user selection data via the user interface indicating the user's selections. In an aspect, the methods may further include using user profile data to define at least one tour route record. As used herein, "user profile" or "profile data" refers to data descriptive of a tour user, for example: geographic location of the user, the user's residence, workplace, or frequently visited places; the user's surrounding context such as current news and or trending events; weather and temperature (e.g., sunny, raining, snowing, daytime/nighttime, hot vs. cold, etc.); personal attributes of the user such as age/sex/height/weight/race; favorite elements of a movie or other media production such as actors, directors, props, movie scenes, dialogs, lines, fictional characters or other celebrities; user's status in a real or fantasy social network; or other profile information. User profile may also include the reward status (points earned in one or more venues of a franchise (e.g., retail stores, amusement parks, live events, etc.) hosted or sponsored by an entertainment company and subscription status in a subscription-based membership service, e.g. Gold level in DC Universe by Warner Bros. Entertainment Inc. User profile information may be used to select or configure one or more locations of the mapped space or content about tour subjects to satisfy at least one of the user's or users' interests, preferences, or safety needs.

The methods may also include using interest factors (e.g., tour data) of one or more users to prepare and optimize the customized tour. The tour data include information for configuring a tour route to satisfy user interests within tour constraints. More detailed examples of tour data are provided herein below. The tour may be experienced by the one or more users together, for example, by several people touring in a single vehicle, or in different vehicles that visit the same locations at the same times or overlapping times. Preparing and optimizing a customized tour may include, for example, to selecting or configuring at least one tour route including locations and contents about tour subjects based on interest factors and other data. In an aspect, at a high level, the interest factors may include preference criteria regarding the user relevant to a purpose of a tour, for example time, place, booking information, stated reason, such that the tour locations or contents are directed to furthering the purpose of the tour, for example, by preparing the users for the tour destination or revisiting one or more tour subjects during the tour. A purpose of a trip may be determined, for example, based on the type of the mapped space, e.g., a film studio, a theme park, a conference site, an outdoor park or recreation area, a sporting facility, a musical performance/concert hall, a mall or collection of shops, a collection of restaurants, a social event, a holiday celebration, etc. In an aspect, the purpose of the trip may be determined or received from a tour application. Further details of the interest factors as used herein will be discussed below, e.g., with reference to FIG. 7B.

In a network architecture, user feedback (e.g., biometric or sensor data) may be collected and processed locally, and used to control or modify at least one tour record, which may include providing content (media content) to the user interface device(s) from a network source. In some embodiments, media content may be controlled locally, and log data provided to a remote server for improving predictive analytics algorithms and tracking use. As used herein, "media content" or "content" for tour subject refers to digital computer-readable sensory content for generating output from a user interface device (e.g., a smart media player). A "predictive analytics algorithm" or more briefly "predictive analytics," may include any one or a combination of a machine-learning algorithm, a rules-based predictive modeling algorithm, a statistical algorithm, or other programming method for forecasting future or unknown events based on current and historical data.

A processor may provide content to a user via software or hardware or both during a time spent in a tour, for example, audio and video output from a media cart, smart phone, VR/AR output device, kiosk, motion simulator or ride, or any other output apparatus the user experiences during the tour. Content may include, for example, electronic media content for generating output such as audio, video and text; virtual, augmented or mixed reality (VR/AR/xR) content; vehicle simulation; image projection/projection mapping (e.g., on clothing, vehicle interior/exterior, etc.); surround screen; olfactory or tactile stimulus; artificial intelligence robot (e.g., an electronic tour guide, or a driver/passenger/user avatar or simulated personality such as a cartoon character by way of image being displayed, audio being played, etc.); and the like. For example, content may include intra-vehicular social applications and games. In some embodiments, the content may be configured to support an interactive game involving tour content. The content may include simulation or avatar of a vehicle driver or a tour guide, one or more fellow users, or a companion. For example, the simulation or avatar may include simulating a tour guide providing a guided tour. In other examples, the content may include a social robot that can be configured to consider user preferences and tour information, such as a persona of the vehicle configuring itself and then displaying a visage with its unique personality on the vehicle's main display screen. In some implementations, a user or a tour guide's user interface device (e.g., mobile device) may contain an application that simulates a tour subject or a character from movies, online video, television, video gaming or other fiction. When the application senses or receives a message informing it that the tour is progressing, it may activate the character simulation and operate the simulation to entertain or inform the user using the voice and mannerisms of the character.

As used herein, users (e.g., passengers in media cart(s) of the customized tour) are consumers of tour content. In some embodiments, a system node may collect real-time user feedback (e.g., neurological or biometric response data) from users for use in controlling content output. As used herein, a "node" includes a client or server participating in a computer network. As used herein, "user" or "users" include all tour participants. Users of content may react passively during viewing or consumption of the content by natural expression of their neurological state.

In an aspect, the methods may include using predictive analytics in processing the user feedback, for example, to predict at least one of the interest factor or the relevance value for specific user cohorts, or in prioritizing tour subject indicators in one or more lesser subsets of all locations in the mapped space. As noted herein above, a tour subject indicator is a digital identifier for content relating to a subject and to a place or object including in a tour. In an aspect, the predictive analytics may be used to produce (e.g., select or configure) tour contents. A predictive analytics process may predict an affinity, e.g., an interest factor or a relevance value, for a user participating in a tour or a group of users in tours running together (tandem tour), based at least in part on the profile data and/or tour data of the user(s), which may include the preference criteria. The affinity may then become part of the passenger profile.

Referring to FIG. 1, a suitable customized tour environment 100 may include various computer servers and other network entities including client entities in communication via one or more networks, for example a Wide Area Network (WAN) 101 (e.g., the Internet) and/or a wireless communication network (WCN) 102, for example a cellular telephone network, using any suitable high-bandwidth wireless technology or protocol, including, for example, cellular telephone technologies such as 3rd Generation Partnership Project (3GPP), 4th generation Long Term Evolution (LTE), 5G fifth-generation cellular wireless, Global System for Mobile communications (GSM) or Universal Mobile Telecommunications System (UMTS), and/or a wireless local area network (WLAN) technology using a protocol such as Institute of Electrical and Electronics Engineers (IEEE) 802.11, and equivalents thereof. The servers and other network entities (collectively referred to as "nodes") may connect directly, dynamically and non-hierarchically to as many other nodes as possible (e.g., as in a mesh network) and cooperate with one another to efficiently route data from/to client devices. The servers may, in an alternative, connect to client devices in a server-client structure. Some client devices can also act as servers.

Client devices may include, for example, user interface devices 120, such as smartphones, smartwatches, notepad computers, laptop computers, and mixed reality (xR) headsets (e.g., 123-127); and same or similar devices as well as well special purpose media players and servers installed as part of media carts 110 (e.g., 121-122).

Computer servers may be implemented in various architectures. For example, the environment 100 may include one or more Web/application servers 104 containing documents and application code compatible with World Wide Web protocols, including but not limited to HTML, XML, PHP and JavaScript documents or executable scripts, for example. The environment 100 may include one or more data servers 105 and/or cloud server 103 for holding data, for example video, audio-video, audio, graphical content components of tour content for consumption using a client device, software for execution on or in conjunction with client devices, for example sensor control and neurological state detection applications, and data collected from users or client devices. Data collected from client devices or users may include, for example, user identity, user profile data, sensor data and application data. User identity, user profile, and sensor data may be collected by a background (not user-facing) application operating on the client device, and transmitted to a data sink, for example, a cloud-based data server 103 or discrete data server 105. Application data can include application state data, including but not limited to records of user interactions with an application or other application inputs, outputs or internal states. Applications may include software for control of tour content and supporting functions. Applications and data may be served to one or more system nodes including media carts 110 (e.g., a tour vehicle) from one or more of the foregoing servers (e.g., 103, 104, 105) or other types of servers, for example, any server accessing a distributed blockchain data structure 106, or a peer-to-peer (P2P) server 130 associated with a peer-to-peer network such as a mesh network (including partial, full, and wireless mesh networks), such as the P2P server 131 that may be provided by a set of user interface devices 123 and 124 in a tandem tour, etc., and the like, operating contemporaneously as micro-servers or clients.

In an aspect, information held by one or more of the data server 105, cloud server 103, a server accessing a distributed blockchain data structure 106, or a peer-to-peer (P2P) server 130 may include a data structure of tour locations and contents, which may include, but are not limited to, media components such as video clips suitable for including in tour content such as a video. The data structure may relate tour subject indicators to relevance value for one or more locations of the mapped space or to content about tour subjects indicated by the tour subject indicators, for example by using edge values of a graph database, and to one or more indicators of semantic meaning relevant to one or more locations of the mapped space and tour contents, and other unique metadata sets characterizing each of the components. As used herein, a "media component" or "component" is a discrete package or collection of data that encodes a component of tour content. Media components may include, for example, "media segments," which are sets of audio, video, audio-video, or other encodings of sensory output by an interactive media player having a beginning, end, and duration. An audio clip, a video clip, or an audio-video clip are examples of a media segment. In various implementations, media components can include data that encodes sensible output. For example, media components can include three-dimensional (3D) model data and related texture data which can be used to produce a media segment when rendered by a processor.

The network environment 100 may include various media carts 110, for example a human-driven media cart 111, 113, 114; an autonomous or connected media cart 112, etc., that may be connected to servers via the WCN 102 and/or WAN 101. In general, media cart 110 may include or be communicably connected to computers used by users to access tour content provided via a server or from local storage.

Still referring to FIG. 1, the user interface devices 120 in the network environment 100 may include various portable devices, for example a mobile smartphone client of a user. Other user interface devices may include, for example, a notepad client, or a portable computer client device, or a mixed reality (e.g., virtual reality and augmented reality) client device. User interface devices may connect to one or more networks. For example, the mobile mesh network 131 may include small radio transmitters that function as a wireless router. The nodes may communicate wirelessly with client user interface devices 123, 124, and with each other by Wi-Fi or other wireless protocol. For further example, the user interface devices 123, 124, in the media carts 113, 114 may connect to servers via a wireless access point (not shown, but may be similar to router 140) communicably connected to the WCN 102 and/or the WAN 101. In some such implementations, the wireless access point (WAP) can be a mobile WAP.

Mesh network nodes may be programmed with software that tells them how to interact within the larger network. By following a set of common mesh network protocols, the mesh network nodes may transport information across the network by hopping the information wirelessly from one mesh node to the next. The nodes may automatically choose the quickest and most reliable path in a process known as dynamic routing. In a wireless mesh network, only one node needs to be physically wired to a network connection like an Internet modem. That one wired node then shares its Internet connection wirelessly with all other nodes in its vicinity. Those nodes then share the connection wirelessly with the nodes closest to them. The more nodes, the further the connection spreads, creating a wireless "cloud of connectivity." In general, client devices may be, or may include, computers or media players used by users to access content provided via a server or from local storage. In traveling media carts such as the example media carts 110, use of a mobile mesh network protocol may allow nearby media carts to share network bandwidth and information more efficiently using different frequencies and cached content.

For example, users in two or more media carts 110 traveling to a popular tour destination such as the famous "Sound Stage 17" at Warner Bros. Studio may be interested in the same or similar tour content. Continuing the example, suppose that the first media cart 113 has already downloaded many media components making up the shared content and comes within range of a second media cart 114 in a compatible mesh network 131. Then, one or more of the user interface devices 120 (e.g., 123, 124, or other user interface devices) may join the mesh network 131. The one or more user interfaces that have recently joined may cooperate with each other or the user interfaces of the first media cart 113 to transmit/receive media components or other data without needing to pass data through the WCN 102 or WAN 101. Thus, demands on other networks may be reduced. Mesh networks may be useful in delivering tour content because client devices in media carts following similar tour routes may be both more likely to request similar content and to be relatively near each other.

Figure 2:
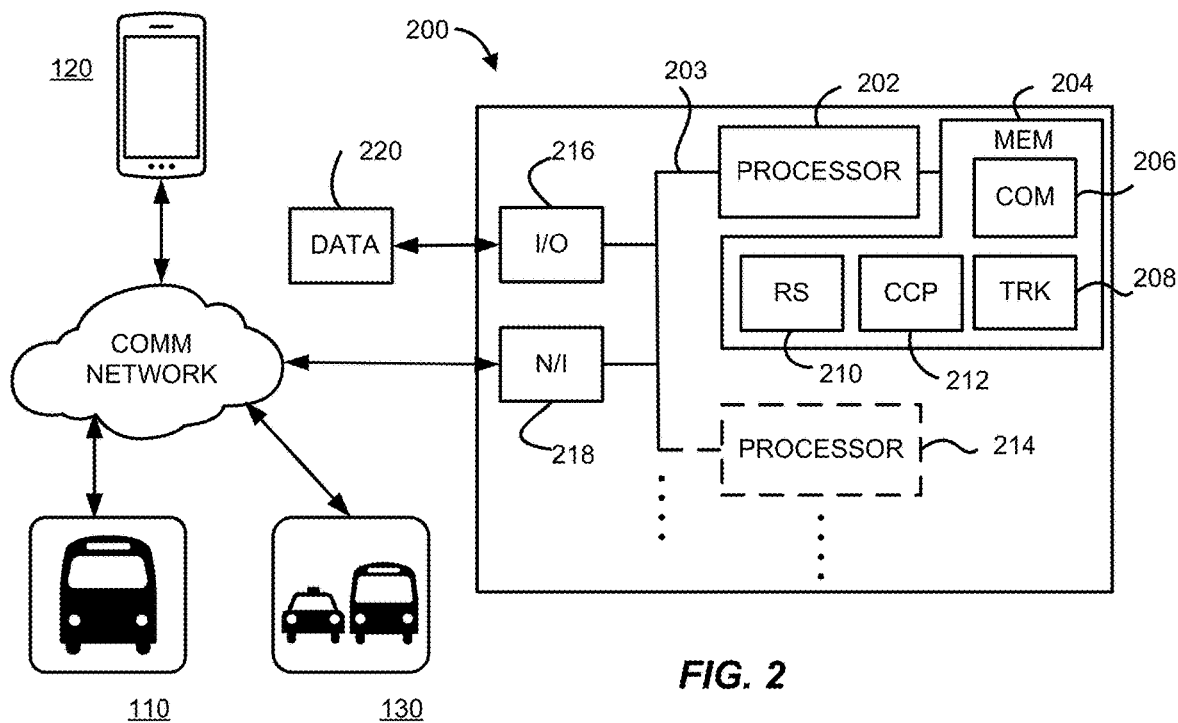
FIG. 2 is a schematic block diagram illustrating aspects of a server for configuring a customized tour of a mapped space.

FIG. 2 shows a tour customization (tour content) server 200 for controlling output of tour content, which may operate in the environment 100, in similar networks, or as an independent server. The server 200 may include one or more hardware processors 202, 214 (two of one or more shown). Hardware may include firmware. Each of the one or more processors 202, 214 may be coupled to an input/output port 216 (for example, a Universal Serial Bus port or other serial or parallel port) to a source 220 for user input data. In some embodiments, the data may include biometric data indicating a neurological or neurophysiological response of one or more users to delivery of the tour content. Viewing history may include a log-level record of variances from a baseline script for a content package or equivalent record of control decisions made in response to user neurological states and other input. The processor may control output of tour content responsive to user feedback indicating a user's neurological state, for example using methods as described for cinematic content in International (PCT) application Serial No. PCT/US18/53614, incorporated by reference herein.

The server 200 may track user actions and neurological responses across tours for individuals or cohorts. Some types of servers, e.g., cloud servers, server farms, or P2P servers, may include multiple instances of discrete servers 200 that cooperate to perform functions of a single server. In some embodiments, the source 220 may be separately or additionally used for sensor data indicative of tour conditions. Suitable sources may include, for example, Global Positioning System (GPS) or other geolocation sensors, one or more cameras configured for capturing environmental conditions and/or user configurations in the interior of the media cart 110 or tandem tours 130, one or more microphones for detecting exterior sound and interior sound, one or more temperature sensors for detecting interior and exterior temperatures, door sensors for detecting when doors are open or closed, sensors for detecting neurological or neurophysiological response of the users of the tour, and any other sensor useful for detecting a tour event or state of a tour user.

The server 200 may include a network interface 218 for sending and receiving applications and data, including but not limited to sensor and application data used for controlling tour content. The content may be provided from the server 200 to a user interface device 120 or stored locally on a client device associated with the user interface device 120. If stored locally on the client device, the client device and server 200 may cooperate to handle sensor data and other user data functions. In some embodiments, the client may handle all content control functions and the server 200 may be used for tracking only or may not be used at all. In other embodiments, the server 200 performs content control functions.

The processors 202, 214 of the server 200 may be operatively coupled to at least one memory 204 holding functional modules 206, 208, 210, 212 of an application or applications for performing a method as described herein.

The modules may include, for example, a communication module 206 for communicating with client devices and servers. The communication module 206 may include instructions that when executed by the processor 202 and/or 214 cause the server to communicate control data, content data, and sensor data with a client device via a network or other connection. A tracking module 208 may include functions for tracking tour events using sensor data from the source(s) 220 and/or navigation and vehicle data received through the network interface 218 or other coupling to a media cart 110 or tandem tour 130. In some embodiments, tracking module 208 may include functions for tracking neurological response and other interactive data for a user or cohort, for one or more tours, subject to user permissions and privacy settings.

The modules may include, for example, a relevance scoring (RS) module 210. The RS module 210 may include instructions that when executed by the processor 202 and/or 214 cause the server to perform one or more of determining relevance of a user's subjects of interest to tour locations. For example, the RS module 210 may apply a rule-based algorithm, a heuristic machine learning algorithm (e.g., a deep neural network, hereinafter "predictive analytics algorithm") or both, to determine relevance of tour locations to selected subjects of user interest. The RS module 210 may perform other or more detailed operations for determining relevance as described in more detail herein below.

The modules may further include a content configuration process (CCP) module 212. The CCP module 212 may include instructions that when executed by the processor 202 and/or 214 cause the server 200 to perform one or more of assembling or configuring tour content for delivery to one or more user interface devices, where the parameters of the tour content or media content title may be configured based at least in part on the profile data and/or tour data (including interest factors), and further operations as described in more detail herein below for configuring a tour route record. In alternative embodiments, the content configuration process or function may be omitted from the server memory 204 and provided in the memory of a client device. The memory 204 may contain additional instructions, for example an operating system, and supporting modules.

Figure 3A:
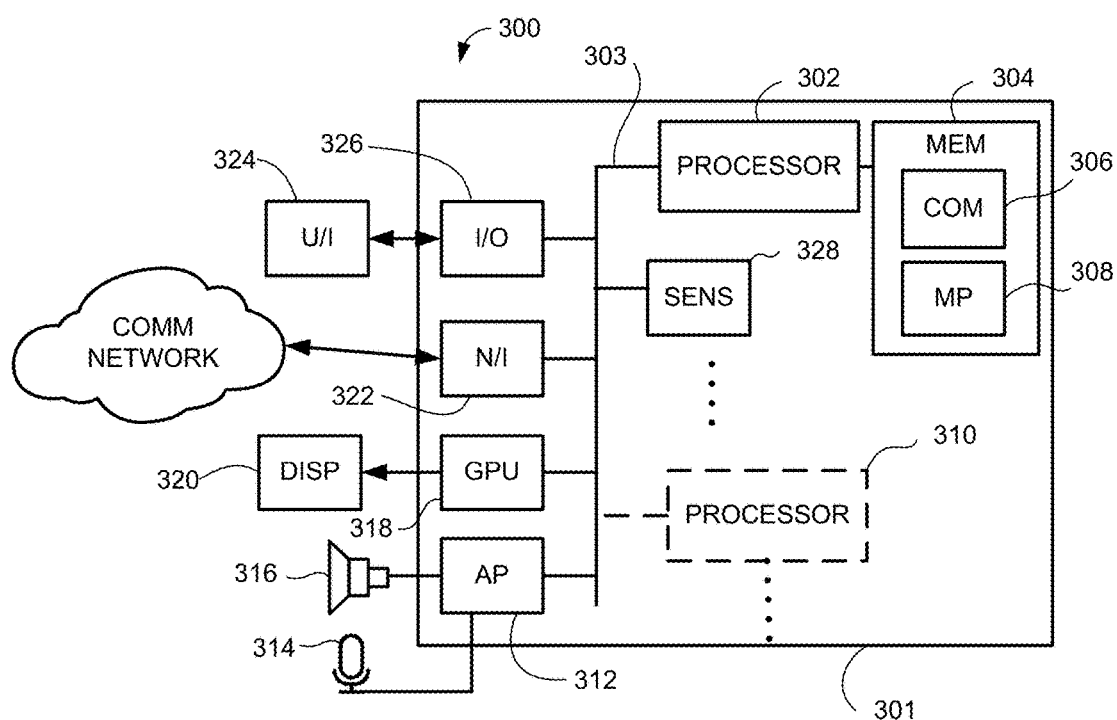
FIG. 3A is a schematic block diagram illustrating aspects of a client device for configuring a customized tour of a mapped space.

Referring to FIG. 3A, aspects of a user interface apparatus (also referred to herein as client device or client) or tour content player 300 for controlling output of tour content responsive to a current state of the tour are described. In some embodiments, the same computing device (e.g., apparatus 300) may operate both as a content consumption apparatus and as a content configuration server, for example, as a node of a mesh network. In such embodiments, the computing device may also include functional modules and interface devices as described above for the server 200. In an optional aspect, the user interface apparatus may control output of content responsive to direct user feedback, or indirect feedback indicating a user's neurological state.

The apparatus 300 may be in or on a media cart 110. The client 300 may include a processor 302, for example a central processing unit based on 80×86 architecture as designed by Intel™ or AMD™, a system-on-a-chip as designed by ARM™, or any other suitable microprocessor(s). The processor 302 may be communicatively coupled to auxiliary devices or modules of the content consumption apparatus 300, using a bus or other coupling. In some aspects, the processor 302 and its coupled auxiliary devices or modules may be housed within or coupled to a housing 301, for example, a housing having a form factor of a tour guide console in a media cart, an onboard infotainment system inside an automobile (e.g., an entertainment system built in or connected to a passenger seat, the ceiling, or any other part of a vehicle), a kiosk, an elevator infotainment display, a digital signage, an in-flight entertainment system, an amusement ride, seats in 4D venues, a television, a set-top box, a smartphone, a tablet, wearable goggles, glasses, visor, or other form factors. In various implementations, the apparatus 300 can comprise an onboard infotainment system inside an automobile (e.g., an entertainment system built in or connected to a passenger seat, the ceiling, or any other part of a vehicle), a kiosk, an elevator infotainment display, a digital signage, an in-flight entertainment system, an amusement ride, seats in 4D venues, a television, a set-top box, a smartphone, a tablet, wearable goggles, glasses or a visor.

The apparatus 300 can comprise a user input device 324 in communication with the processor 302 for providing user control input to a tour customization process as described herein. The tour customization process can include outputting video and audio. The output video can be configured to be displayed on a conventional flat screen or projection display device. In some embodiments, the tour customization process may be, or may include, audio-video output for an immersive mixed reality content display process operated by a mixed reality immersive display engine executing on the processor 302.

User input may include, for example, selections from a graphical user interface or other input (e.g., textual or directional commands) generated via a touch screen, keyboard, pointing device (e.g., game controller), microphone, motion sensor, camera, or some combination of these or other input devices represented by block 324. Such user input device 324 may be coupled to the processor 302 via an input/output port 326, for example, a Universal Serial Bus (USB), Bluetooth®, Wi-Fi™, or equivalent ports. Control input may also be provided via one or more sensors 328 coupled to the processor 302. The sensors 328 may include, for example, a motion sensor (e.g., an accelerometer), a position sensor, a camera or camera array (e.g., stereoscopic array), a brainwave detector, a biometric temperature or pulse sensor, a touch (pressure) sensor, an altimeter, a location sensor (for example, a Global Positioning System (GPS) receiver and controller), a proximity sensor, a motion sensor, a smoke or vapor detector, a gyroscopic position sensor, a plenoptic camera, a radio receiver, a multi-camera tracking sensor/controller, an eye-tracking sensor, an infrared/heat signature sensor, a microphone or a microphone array. In some aspect, any or all of the sensors 328 may be housed in a single or multiple devices, such as a smartphone and the like. In some implementations, the sensors 328 may be located inside the media cart, outside (e.g., on the exterior of) the media cart, or both. For example, accelerometers, bump cancelling sensors, audio/noise canceling sensors, and/or light canceling sensors may be located outside, and position sensors (e.g., sensing position(s) of passenger(s)), depth sensors, gesture sensors, and/or microphone(s) may be located inside the media cart 110. For example, a smartphone device, an IoT device, a smart device (e.g., Apple Watch™ by Apple, Inc, Google Home™ by Google, Inc., Amazon Echo™ by Amazon, Inc., etc.) or other network-enabled device may house and provide or augment functionalities of one or more of the foregoing sensors. The one or more sensors 328 may further include, for example, a microphone, array or microphones, or other audio input transducer for detecting spoken user commands or verbal and non-verbal audible reactions to output of the tour content.

In optional aspects, the sensor or sensors 328 may detect biometric data used as an indicator of the user's neurological state, for example, facial expression, skin temperature, pupil dilation, respiration rate, muscle tension, nervous system activity, or pulse. In addition, the sensor(s) 328 may detect a user's context, for example an identity, position, size, orientation and movement of the user's physical environment and of objects in the environment, motion or other state of a user interface display, for example, motion of a virtual-reality headset.

In optional aspects for use with virtual reality or augmented reality output, the sensor or sensors 328 may generate orientation data for indicating an orientation of the apparatus 300 or a passenger using the apparatus. For example, the sensors 328 may include a camera or image sensor positioned to detect an orientation of one or more of the user's eyes, or to capture video images of the user's physical environment or both. In some aspect, a camera, image sensor, or other sensor configured to detect a user's eyes or eye movements may be integrated into the apparatus 300 or into ancillary equipment coupled to the apparatus 300.

Sensor data from the one or more sensors 328 may be processed locally by the processor 302 to control display output, and/or transmitted to the server 200 for processing by the server in real time, or for non-real-time processing. As used herein, "real time" refers to processing responsive to user input without any arbitrary delay between inputs and outputs; that is, that reacts as soon as technically feasible. For example, real time processing can include processing in a time interval less than 10 minutes. "Non-real time" refers to batch processing or other use of sensor data that is not used to provide immediate control input for controlling the display, but that may control the display after some arbitrary amount of delay.

To enable communication with another node of a computer network, for example the tour content server 200, the client 300 may include a network interface 322, e.g., an Ethernet port, wired or wireless, or a 4G/LTE/5G cellular communications network interface, or other wireless network. Network communication may be used for data transfer between the client 300 and other nodes of the network, for purposes including data processing, content delivery, content control, and tracking. The client 300 may manage communications with other network nodes using a communications module 306 that handles application-level communication needs and lower-level communications protocols, preferably without requiring user management.

The apparatus 300 can further comprise a display 320 coupled to the processor 302, for example via a graphics processing unit 318 integrated in the processor 302 or in a separate chip. The display 320 may include, for example, a flat screen color liquid crystal (LCD) display illuminated by light-emitting diodes (LEDs) or other lamps, a projector driven by an LCD display or by a digital light processing (DLP) unit, a laser projector, a light field display (e.g., support near-eye solution and far-eye solution, or generate images from different planes a-la wave guide bending), a pass-through display e.g., a head-mounted virtual retinal display or other digital display device. For example, a switchable electric glass screen that transitions from transparent to opaque, paired with a 4K transparent LCD display, may be used. Example of such display device includes the display screens used in "Field Trip to Mars" by Framestore VR Studio (http://framestorevr.com/field-trip-to-mars/). Other digital display devices may also be used.

The display device 320 may be incorporated into a part of (e.g., a window of) media cart (incl. virtual reality headset worn by a passenger inside a vehicle), for example, an autonomous vehicle, an amusement ride, an interior of transportation vessels such as an elevator, taxi, airplane, bus, etc., a kiosk, or other immersive display systems. Video output driven by a mixed reality display engine operating on the processor 302, or other application for coordinating user inputs with an immersive content display and/or generating the display, may be provided to the display device 320 and output as a video display to the user. Similarly, an amplifier/speaker or other audio output transducer 316 may be coupled to the processor 302 via an audio processor 312. Audio output correlated to the video output and generated by the media player module 308, tour content control engine or other application may be provided to the audio transducer 316 and output as audible sound to the user. The audio processor 312 may receive an analog audio signal from a microphone 314 and convert it to a digital signal for processing by the processor 302. The microphone can be used as a sensor for detection of neurological state and as a device for user input of verbal commands.

The apparatus 300 may further include a random-access memory (RAM) 304 holding program instructions and data for rapid execution or processing by the processor during controlling interactive media content in response to trip information or other data. When the client 300 is powered off or in an inactive state, program instructions and data may be stored in a long-term memory, for example, a non-volatile magnetic, optical, or electronic memory storage device (not shown). Either or both RAM 304 or the storage device may include a non-transitory computer-readable medium holding program instructions, that when executed by the processor 302, cause the device 300 to perform a method or operations as described herein. Program instructions may be written in any suitable high-level language, for example, C, C++, C#, JavaScript, PHP, or Java™, and compiled to produce machine-language code for execution by the processor.

Program instructions may be grouped into functional modules 306, 308, to facilitate coding efficiency and comprehensibility. The modules, even if discernable as divisions or grouping in source code, are not necessarily distinguishable as separate code blocks in machine-level coding. Code bundles directed toward a specific type of function may make up a module, regardless of whether machine code on the bundle can be executed independently of another machine code. The modules may be high-level modules only. The media player module 308 may perform operations of any method described herein, and equivalent methods, in whole or in part. Operations may be performed independently or in cooperation with another network node or nodes, for example, the server 200.

Figure 3B:
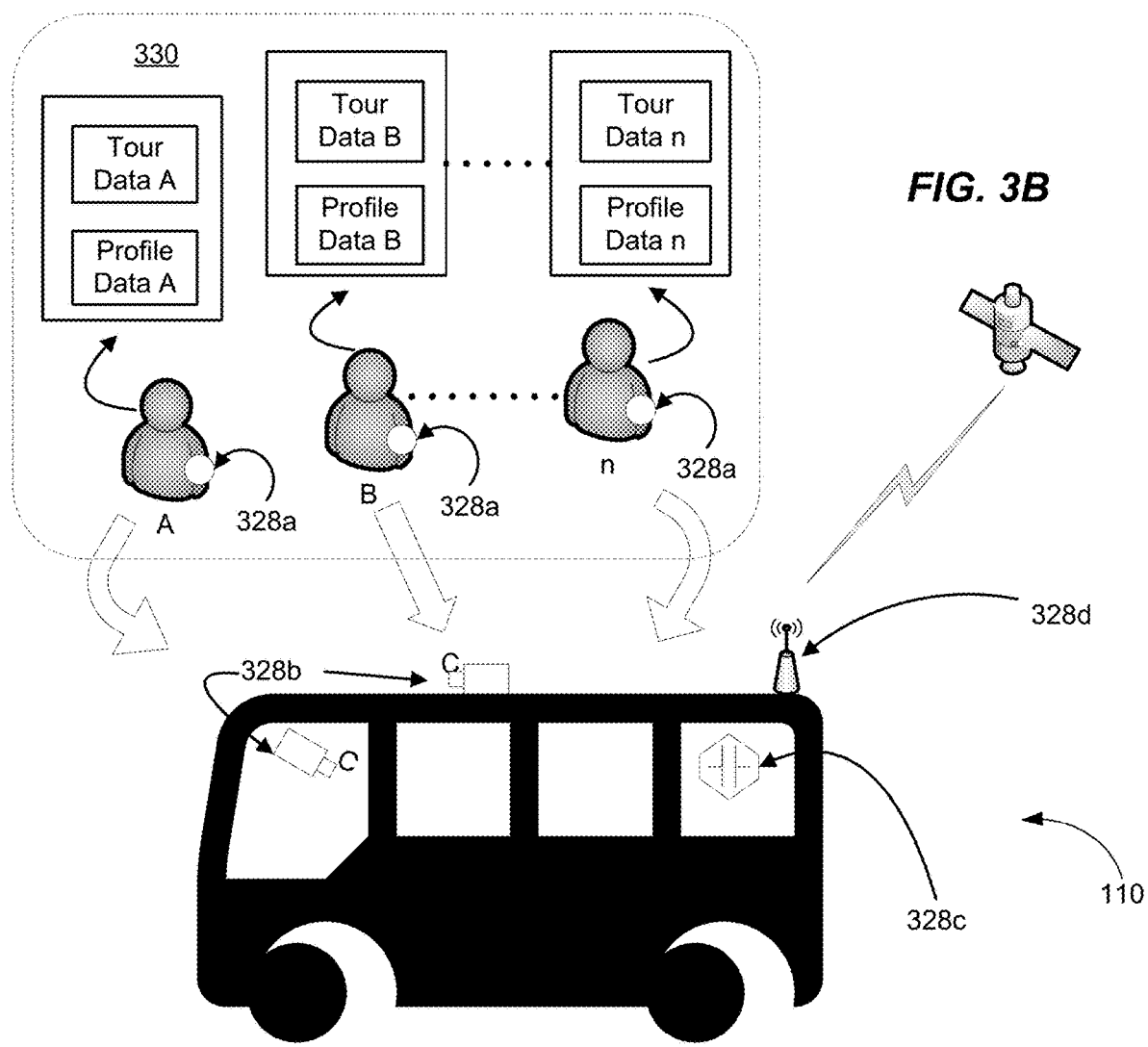
FIG. 3B is a schematic block diagram illustrating aspects of a system and apparatus for configuring a customized tour of a mapped space, which may involve controlling output responsive to user selection data and tour data, profile data, and/or sensor data indicating one or more user feedback (e.g., biometric data or neurological state(s)).

FIG. 3B is a schematic block diagram illustrating aspects of a system and apparatus for configuring a customized tour of a mapped space, which may involve controlling output responsive to, trip data, profile data, and/or sensor data indicating one or more user feedback (e.g., biometric data or neurological state(s)). In an aspect, one or a group of users 330 is participating in a tour on a media cart 110. In one example, the users 330 includes user A, user, B, and up to n number of users that may fit in the media cart 110. In another aspect, a user is traveling alone in a media cart 110. The user can be accompanied by a tour guide or a driver or be travelling alone in the media cart. As discussed above, the media cart 110 can be equipped with a user interface apparatus 300. Each user provides a respective profile data and tour data, which may be provided to the processor (e.g., processor 302) at the start of the customized tour. In some implementations, biometric sensors 328a individually associated with each user in the media cart can provide biometric feedback information about the user. In some implementations, the media cart 110 may be equipped with internal or external cameras 328b that may capture and provide audio-video information about one or more locations, tour subjects, objects, etc., within sight from the media cart, or user(s) inside the media cart 110. In an aspect, the media cart 110 is equipped with one or more biometric sensors 328c that provide biometric feedback information about the passenger(s) onboard the media cart 110. Media cart 110 may also be equipped with a geolocation sensor 328d that provides geolocation and trip information of the media cart 110.

Figure 3C:
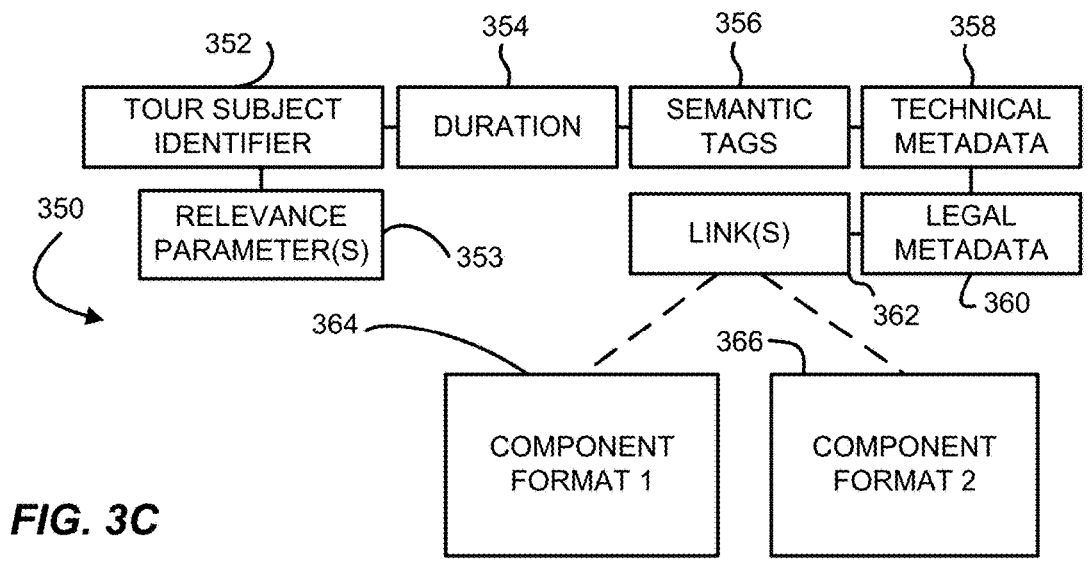
FIG. 3C is a schematic block diagram illustrating an example of a data structure for relating each of the tour subject indicators to a relevance value for one or more locations of the mapped space and to content about one or more subjects indicated by the tour subject indicators.

Systems, apparatus and methods as described herein may make use of a data structure that relates tour route record in an ordered arrangement of tour subject indicators to one or more relevance value/parameters for one or more locations of the mapped space and to contents about tour subjects, including at least one or more indicators of semantic meaning relevant to one or more tour subjects. FIG. 3C shows an example of a data structure 350 for relating tour subject indicators each referenced by a tour subject identifier 352 to relevance value/parameters 353 for one or more locations of the mapped space and to contents 364, 366 about one or more tour subjects indicated by the tour subject indicator, and the data structure 350 may also be related to user profile such as user identity, preference data, interest factors, and/or other data. The data structure 350 may be implemented as a relational database, a graph database, a flat data table, a distributed ledger, or by any other useful computer-readable digital data structure for storing, locating and accessing related components of binary-encoded data. The data structure 350 may include self-associated records each including a unique identifier 352 of a content component (e.g., an index number, a tour subject identifier, etc.); a duration 354 value (e.g., frames, seconds, minutes, etc.) of a tour content (e.g., duration of each content segment including a predetermined delivery period, estimated transit times between each location, estimated linger time at each tour location) if applicable; one or more semantic tags 356 relevant to tour location (e.g., whether the location is indicated as available or unavailable/accessible or not accessible; scheduled use (time/duration) of the tour locations (e.g., by one or more prior tours), tour subjects, contents, or passenger profile data; technical metadata 358 as needed to select, configure or produce tour content that includes the content component or media clips identified by the identifier 352, legal metadata such as for example license or censorship requirements applicable to the content component, and one or more links to non-transitory, computer-readable copies 364, 366 of the content component. The copies 364, 366 may be identical copies for redundancy or more efficient distribution, may be copies in different formats (e.g., a large/high-res format 364 and a small/low-res format 366) for different output modes, or both. It may be efficient to store the copies 364, 366 in a different storage system than the data structure 350 for more efficient operation of the server 200. For example, the server 200 may load the data structure 350 into its Random Access Memory (RAM) and access the component copies 364, 366 on a remote server or local magnetic or electronic memory device.

FIG. 4A is a schematic diagram showing illustrative features of a portion of an electronic data structure, e.g., a graph database 400 (incl. mesosphere 410, stratosphere 420, and troposphere 430), and interactions of a user 402 with aspects of a system and apparatus 400 for configuring a customized tour of a mapped space 401. In an aspect, the graph database 400 is an electronic data structure in which tour subject indicators are associated to a relevance value for one or more locations of the mapped space and to content about a subject indicated by the tour subject indicator for delivery at corresponding ones of the one or more locations, wherein the relevance value indicates a degree of relevance of each location of the one or more locations to the each of the tour subjects.

The atmosphere can be a metaphor for the electronic data structure illustrated in FIG. 4A. Accordingly, the electronic data structure in FIG. 4A can comprise three layers—an upper level mesosphere 410 including data (e.g., image) associated with characters and/or actors, a mid-level stratosphere 420 including information regarding movie titles, TV shows or other content associated with the characters and/or actors in the mesosphere 410 and a lower level troposphere 430 including information regarding different locations in the mapped space 401 associated with the information in the stratosphere 420.

For example, referring again to FIG. 4A, the mapped space 401 is the Warner Bros. Studio (Burbank, Calif.), and the user 402 is "Amy," a tour guest. The customized tour may be conducted by a human tour guide 470, e.g., "Billy," and tour guests including Amy 402 may ride a media cart 460 equipped with user interface devices 480, 485 to view or otherwise enjoy contents for tour subjects. Amy 402, prior to or upon arriving at the mapped space 401 to join a customized tour, chooses a number of tour subject indicators such as titles of movies, television shows, or scenes, actors, props, etc. appearing in the movies or television shows, or other personalities such as directors and producers associated with the tour subject indicators, from a list of selectable tour subject indicators. In an aspect, one or more processors of a system and apparatus for implementing the method for configuring a customized tour of a mapped space described above (hereinafter collectively "processor") presents an ordered arrangement of tour subject indicators to a user, from which the user indicates a lesser subset selected from the ordered arrangement of tour subject indicators. For example, in an aspect, Amy 402 interacts with a tour terminal 403, which may be a computer device 120 communicably connected to the network 100, to choose the tour subject indicators. In another aspect, Amy 402 may use her smartphone device 120 to choose the tour subject indicators.

Figure 4B:
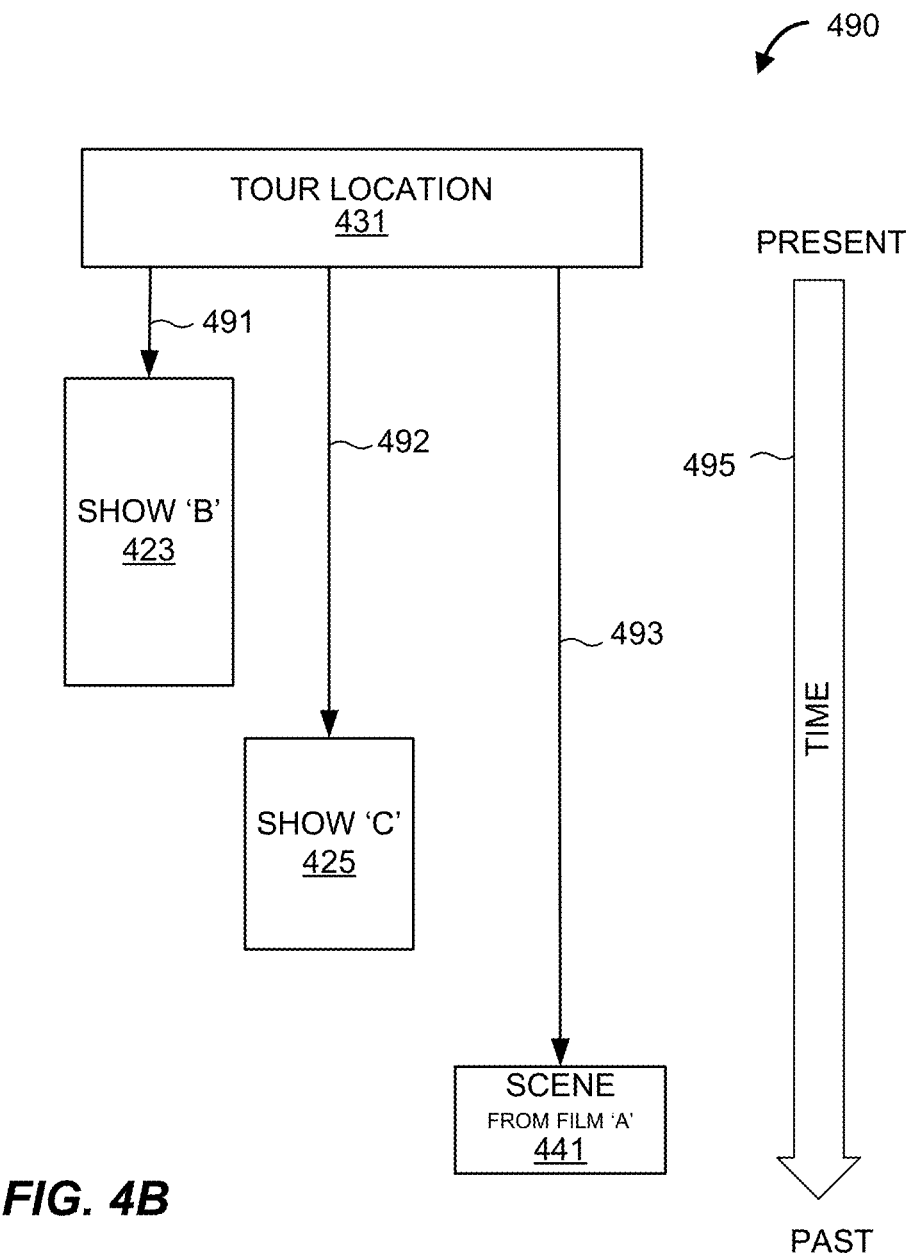
FIG. 4B is a schematic diagram showing features of a portion of a metaphoric archeological dig in accordance with some embodiments of the disclosure.

FIG. 4B is a schematic diagram showing illustrative features of a portion of an electronic data structure, e.g., a graph database 490. As illustrated in FIG. 4B, a tour location 431 of the mapped space 401 may be associated with different shows at different times. Records in the database may be represented as nodes and connected by edges each associated with a relationship value or values that represent a strength of a relationship between the nodes in each of one or more categories, or in an aggregate measure. Together, a collection of nodes and edges with relationship metadata may be referred to herein as an "graph database." The graph database contains values for each of the edge relationships on which relevance can be rated, i.e., the "relevance value" as discussed herein.

The electronic data structures illustrated in FIG. 4A and FIG. 4B may be stored using one or more of the servers 103, 104, 105, 106, and 131. The electronic data structures illustrated in FIG. 4A and FIG. 4B may be stored locally on client device 300, or stored remotely and accessed through communications network (e.g., WAN 101, WCN 102, etc.). The electronic data structures illustrated in FIG. 4A and FIG. 4B may be stored entirely in one storage location or divided into sections and each section may be stored at one of the plurality of storage locations described above. The electronic data structures illustrated in FIG. 4A and FIG. 4B may be composed of nodes and edges. In some embodiments, the electronic data structures illustrated in FIG. 4A and FIG. 4B may be represented as pointer tables. In other embodiments, data structures such as trees, bi-directional graphs, buckets, or arrays may be used to represent the electronic data structures illustrated in FIG. 4A and FIG. 4B in storage locations.

In an example as illustrated in FIG. 4A, Amy 402 has chosen Scene 441 from Film 'A' as a tour subject indicator. Scene 441 from Film 'A' is a node associated with a location 431, data for which belongs to troposphere 430 in the graph database 400 of tour subject indicators. In an aspect, the processor may receive the entry of scene 441 from Film 'A' as a user selection data from the user 402 via a kiosk 403 or other client device, indicating a lesser subset selected from the ordered arrangement of tour subject indicators. Nodes 441 and 443 are relevant to the movie, Film 'A', represented by the node 422. Each node may be associated with edge data defining relationships between nodes. For example, nodes 441 and 422 may be associated with edge values (e.g., metadata) 451, 452, 499 representing relevance to an article about a filming location 443, for example, a set used for scenes taking place in the city of "Casablanca." An edge 451 leading to node 441 may branch off an edge 452 connecting the Film 'A' node 422 to the tour location node 432. Each connecting edge 499, 451, 452 represents relationships (e.g., relevance scores) from which relevance of the corresponding nodes 422, 443, 441 may be computed. In the illustrated example, both the scene 441 and the article 443 also relate to studio location 432 and to Film 'A' 422. Film 'A' 422 may relate to other tour locations, for example, to second tour location 431 via edge 454. Supposing, for example, that tour location 431 was used to film scenes in Paris, if scene 441 is in Paris, edge 451 would connect to edge 454 instead of edge 452. Edges may have different relevance scores determined by a scheme. For example, edge 499 may have a lower relevance score (e.g., 40%) than edge 451 (e.g., 80%) reflecting a relevance determination may by any suitable method.

In an aspect, edges may connect nodes of different levels (e.g., categories) within the graph database 400. For example, node 441 may concern a scene shot at tour location 432 and as such may be categorized in the lowest level 430 (e.g., troposphere), while node 422 is associated with Film 'A' and belongs to a middle layer 420 (e.g., stratosphere). Similarly, node 411 in an upper layer 410 (e.g., mesosphere) represents an Actor 'ε' who played a character in the Film 'A' 422 and it is connected to the node 422 by edge 453. In some embodiments, nodes may be connected to a plurality of other nodes. For example, node 422 is connected to nodes 431, 432, and 443 associated with location information of the mapped space 401 in addition to nodes 411 and 441.

In some embodiments, the processor may identify a plurality of tour subject indicators as candidate components associated with a user selection data by cross-referencing the user selection data with an electronic data structure such as the graph database 400 to identify a node corresponding to the user selection data, and then identifying candidate components connected to the node corresponding to the user selection data. For example, the processor of the present method may identify that node 441 corresponds to the term, scene from Film 'A' indicated by the user 402. The processor may then determine Film 'A' is a candidate component associated with node 441 by the connection via edges 451 and 452. The processor may further determine that Actor 'ε' is another candidate component via the connection via edge 453." Similarly, the processor may further determine that the tour locations 431, 432 have relevance to Node 441 via the edges 452 and 454, the latter via node 422.

In some embodiments, edge (e.g., edge 454) may be associated with a relevance value that represents a strength of association. For example, the relevance value indicates a degree of relevance of each location of the one or more locations to each of the tour subjects. A higher value may correspond to higher strength of association of degree of relevance, while the lower value may correspond to lower strength of association or degree of relevance. Values may be represented as values on any gradient scale with or without endpoints, or as percent values. In some aspect, the processor may adjust or modify the relevance value based on user feedback. For example, in an aspect, user feedback may be received during or after completing at least a portion of a tour following the tour route record.

The processor may modify this value in response to receiving user confirmation or user preference data about an association between the term corresponding to node 441 and the candidate component corresponding to node 422. For example, the processor may present to a user a query asking for confirmation of association or preference between the node 441 regarding a scene from Film 'A' and the tour location 432, and receive user selection input or other response. In response to receiving the user input, the processor may determine a relevance value linking node 441 to node 431. For example, the processor may determine that edge 452 connects nodes 422 and 432, and modify a value associated with edge 451 that relates to both node 422 and node 432.

In some embodiments, the value associated with an edge may be incremented for every user who confirms an association between any two nodes of the system 400. In some embodiments, for example, a relevance value associated with edge 454 may be changed based on a ratio between the number of users who confirmed an association between nodes 441 and 431, and the number of users who denied an association between nodes 441 and 431. In some embodiments, the processor may only transmit the relative change in value and an identifier of edge 454. For further example, the processor may decrease a relevance value associated with an edge. For example, the processor may receive a user input of selection of negative response and determine that the relevance score or scores between nodes 422 and 431 should be decreased. In response to the determination, the processor may decrease the value associated with edge 454.

In some embodiments, the processor may modify the value associated with an edge in response to information received from electronic data indicating user preferences, or other data in the servers 103, 104, 105, 106, and 131. For example, the processor may receive information through communications network (e.g., 101, 102) that a popular scene in Film 'A' was filmed at tour location 431, and therefore assign a high relevance value to the linkage between Film 'A' 422 and the location 431. In response to determining an increased relevance value, the processor may increase a recorded relevance value associated with edge 454 by transmitting the new value to electronic data indicating user preferences, or other data in the servers 103, 104, 105, 106, and 131. to change the value.

In some embodiments, the processor may determine whether to include content associated with a node in tour based on multiplying relevance scores of connecting links, or equivalent mathematical operation, and comparing resulting score with a threshold. The processor may move the threshold up or down to include just enough nodes needed to fill an allotted time for the tour. For example, suppose the user 402 requests a tour including scene 441, and links 451, 462 each have a value of 90% (0.9). Multiplying the two, the resulting relevance for location 432 is 81%. So long as the threshold is less than 81%, the processor will include location 432 in the tour. Conversely, suppose link 499 has a score of only 60%. Then, the threshold will need to be not less than 54% (90% multiplied by 60%) to include information about node 443 in the tour, because to get from node 441 to node 443 requires traversing the links 451, 499 with respective relevance values of 90% and 60%. In some cases, the processor may determine that a node does not satisfy a minimum aggregate relevance score constraint and therefore exclude it from the tour route record.

For further example, edges may be traversed through the troposphere 430 like any other layer. A node 423 for Show 'B' is connected to locations 432 and 433 on the tour route. Supposing again that a user selects Node 441 that is connected to the tour location 432. The processor may multiply or otherwise process the relevance scores of links 451, 452 and 455 to decide whether information regarding Show 'B' (node 423) should be included in the tour while stopped at the location 432. Likewise, the processor may similarly calculate an aggregate relevance score for edges 451, 452, 455 and 457 to determine whether to include information regarding Actor 'α' (node 412), for edges 451, 452, 455 and 458 to determine whether to include information regarding Actor 'β' (node 413), and for edges 451, 452, 455 and 456 to determine whether to include a visit to tour location 433 in the tour. The illustrated configuration of nodes and edges is for example only; other configurations may also be useful.

Once the processor has determined tour 500 data by similarly traversing edges for input items of interest to a user or group of users, it may send the data to a media cart 460 including terminals/displays 480 for passengers and at least one terminal/display for use by a tour guide 470.

FIG. 4B shows additional aspects 490 of electronic data structure (e.g., graph database 400) corresponding to an "archeological dig" metaphor. This structures services situations in which a tour location relates to many different people or events of interest occurring over a span of time 495. The processor using edges 491, 492 and 493 with associated chronological metadata may determine whether a tour location 431 or other node (e.g., a person or object) is relevant to different topics of interest that happened at different times. For example, a tour location 431 such as a set or sound stage may have been used in different productions over the years, such as a recent relatively long usage in Show 'B' 423, an older and shorter use in Show 'C' 425, and an oldest, briefest use for a scene of Film 'A'. In addition to applying relevance scores of edges 491, 492 and 493 as described above, the processor may use chronological metadata also. For example, a processor may arrange a tour presentation in chronological order (newest to oldest, or vice-versa), or may use age and duration of usage as factors in computing relevance for a customized tour.

Figures 5, 6:
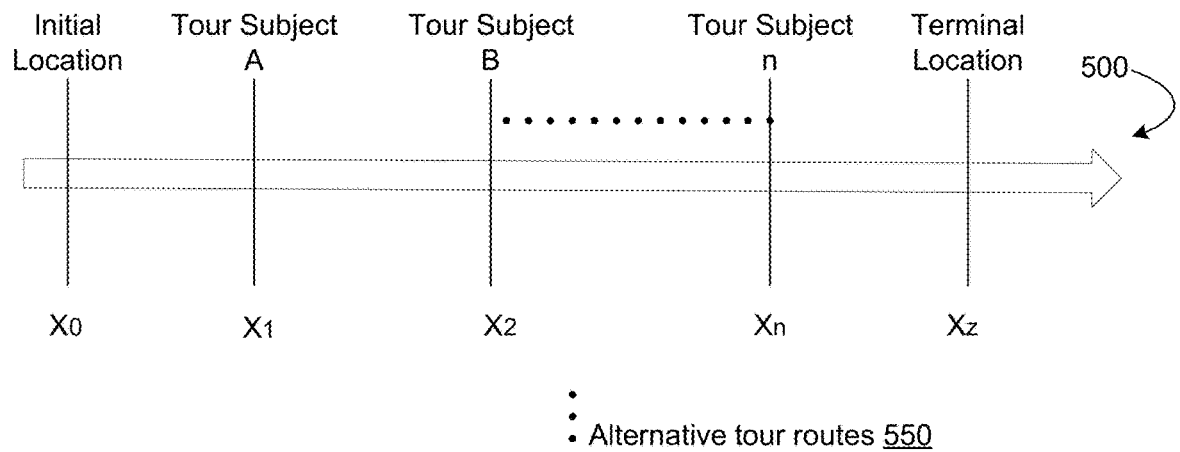
FIG. 5 is a concept diagram illustrating a tour route of locations and related tour subjects, initial location, and terminal location that may be involved in a customized tour of a mapped space according to one or more embodiments.
FIG. 6 is a schematic block diagram illustrating an example of a data structure of tour route records.

FIG. 5 shows a tour route of locations and related tour subjects, initial location, and terminal location as may be represented by a tour route record for a customized tour 500 of a mapped space according to one or more embodiments. FIG. 5 illustrates a map of initial location ($X_0$), tour subject A, B ... n ($X_1, X_2, ... Xn$), and terminal location (Xz) that may be involved in a corresponding tour 500 according to one or more embodiments. In an aspect, Initial Location refers to the location $x_0$ within the mapped space (e.g., 401)

where the tour commences. Tour Subject A refers to a tour subject at Location $X_1$, Tour Subject B to a tour subject at Location $X_2$, and similarly up to Tour Subject n, each of which refers to the location Xn, where all of these locations reside within the mapped space. In an example, Terminal Location refers to the drop-off location $X_z$ where passengers A, B . . . n will be dropped off once the tour is completed, such that no passenger will remain in the media carts 110 thereafter. In some embodiments, the pick-up location $X_0$ may be set by the processor as the initial location at which the one or more processors schedule initiation of a tour session, and the drop off location $X_z$ may be set as the terminal location at which the one or more processors schedule termination of the tour session. In another aspect, the initial location and the terminal location may be set by the processor at different locations between $X_0$ and $X_z$.

In an aspect, the processor calculates an aggregate relevance score for the lesser subset of tour subject indicators indicated by the user and locations of the mapped space. In an aspect, any or all of the Tour Subjects A, B, . . . n form a part of the tour route record, as may be defined by the processor, which includes an ordered list of locations being a lesser subset of all locations in the mapped space that satisfy at least a minimum aggregate relevance score constraint and a maximum tour duration constraint. In some embodiments, a plurality of alternative tour routes 550 may be defined by the processor, where the respective alternative tour routes may include same tour subjects scheduled to occur in different orders or at different times, or different tour subjects for comparing to one another.

FIG. 6 is a schematic block diagram illustrating an example of a data structure of tour route records 600 for use by one or more processors in the method for configuring a customized tour of a mapped space, illustrated as a text data table representing tour data regarding the tour subjects relevant to alternative tour routes, for example time, place, availability, stated reason or derived purpose of the tour, such that the tour content components are configured based on the tour data. The table may be organized as a graph database, a relational database model, a self-referential database model, or any other suitable model known in the art or that may come to be known in the future. In an aspect, a first row holds tour subject identifiers, such as the name of the tour subject or a unique ID assigned to the tour subject. In an aspect, a second row holds the location information for the respective tour subjects A, B . . . n identified in the first row (ID). In an aspect, a third row may hold content information about the tour subject, such as media files (a, b, . . . n) or script data (aa, bb, . . . nn). A fourth row may hold duration information during which the user or users participating in the tour is expected to linger at the respective tour subject location. For example, the duration information may be derived by the processors based on a predetermined delivery period for the content for delivery at the each location. A fifth row may hold grade information, which includes a relevance value that indicates a degree of relevance of each location to each tour subject indicated for delivery at the each location. A sixth row may hold current accessibility information about the respective candidate locations. For example, the candidate location may be marked unavailable based on a scheduled use of the location by one or more prior tours.

Figure 7A:
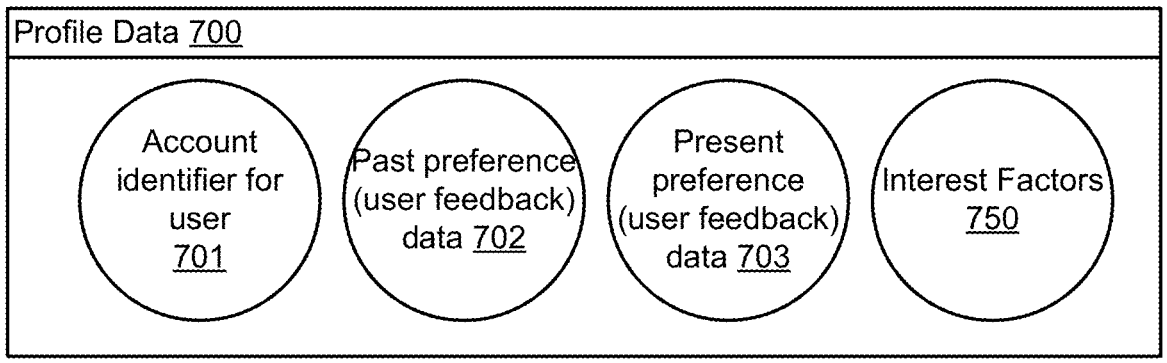
FIG. 7A is a schematic block diagram illustrating an example of a data structure of profile data.

FIG. 7A is a schematic block diagram illustrating an example of a database structure of profile data 700 for use by one or more processors in the method for configuring a customized tour of a mapped space, which may be modeled as a text data table like the example of the data table for the tour date records 600 discussed above with reference to FIG. 6. The table may be organized as a graph database, a relational database model, a self-referential database model, or any other suitable model known in the art or that may come to be known in the future. The database of profile data 700 may include any or all of the profiling data pertaining to users as previously defined herein, and in particular, the database of profile data 700 may include account identifier for user 701, past preference (user feedback) data 702, present preference (user feedback) data 703, and interest factors 750 with respect to each user with the account identifier 701. If an account identifier for a user does not exist or is lost for a given user, one may be created anew, including present preference data and interest factors, some or all of which may be automatically populated with pre-defined default datasets by the processor.

In an aspect, the profile data for a user may include data bits representing at least the user identity (account identifier), user feedback (incl. past and present preferences), and interest factors. As used herein, the interest factors are a subset of a profile data for a user, and it is defined as electronic data that describes the preferences of one or more users for tour content, and may include, for example, favorite tour locations, actors, characters, types of entertainment, genres, colors, color scheme, music, and so forth.

Figure 7B:
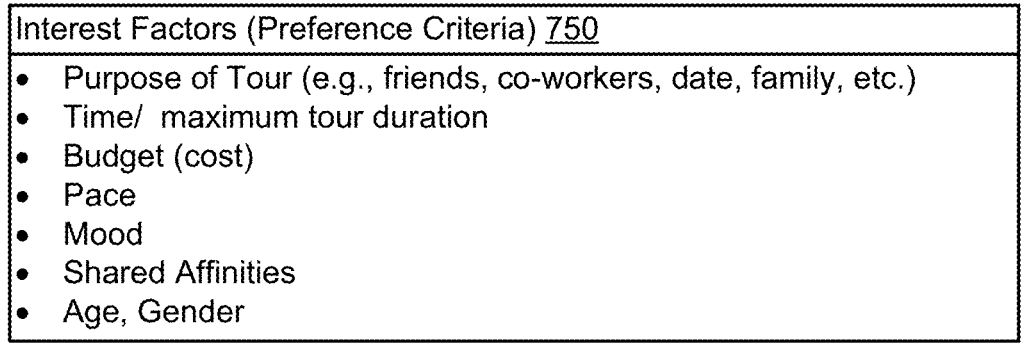
FIG. 7B is a schematic block diagram of the interest factors aspects of the data structure of profile data.

FIG. 7B is a schematic block diagram of the interest factors (preference criteria) aspects 750 of the database structure of the profile data database 700. In an aspect, the interest factors or preference criteria may be used by the processor to assign or deduce present preference data of the user identified by the account identifier. Preference criteria 750 may include: purpose of the tour, such as outing with friends, co-workers, date, family, etc.; time budget (maximum tour duration) of the tour; budget (cost); pace; mood, shared affinities, and user attributes such as age and gender. Once a user experiences a tour 500 (or any of the alternative tour routes 550; FIG. 5), the preference criteria assigned or deduced as the present preference data will be moved to the past preference data bucket of the respective user, and past preference data may be maintained as a log history in the database of profile data 700.

Figure 8:
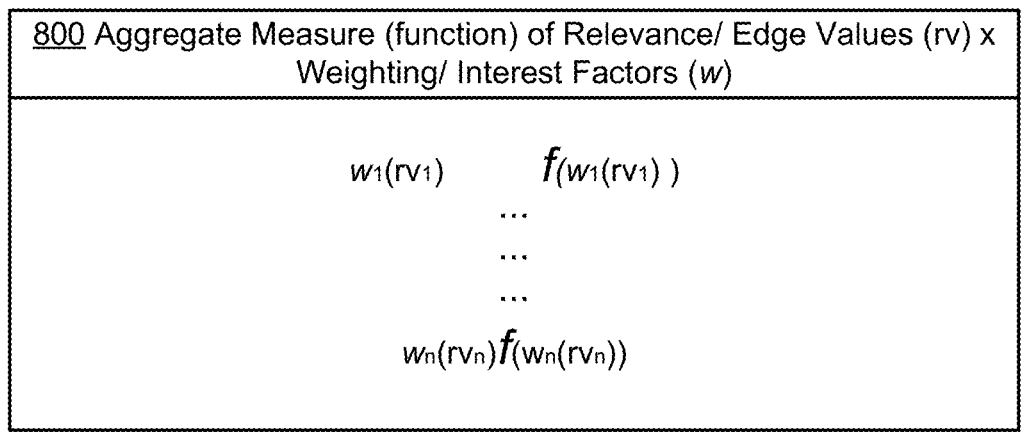
FIG. 8 is a schematic block diagram of the weighting of aggregate measure of relevance or edge values according to one or more embodiments.

FIG. 8 is a schematic block diagram of the weighting of aggregate measure of relevance values/edge values according to one or more embodiments. In an aspect, the processor may calculate the aggregate relevance score (rv) as a function of the weighting criteria/interest factors 750 ($w$) to derive a common interest in tour content or in a tour tandem tours. In another aspect, the processor may use the weighted aggregate measure of relevance values/edge scores to determine the preference criteria with highest priority for users participating in the tour or tandem tours.

Having described examples of suitable clients, servers, and networks for preparing an optimizing a customized tour of a mapped space, more detailed aspects of these methods will be addressed. The apparatus 200 and 300 may each perform the methods, alone, or working in cooperation.

Figure 9:
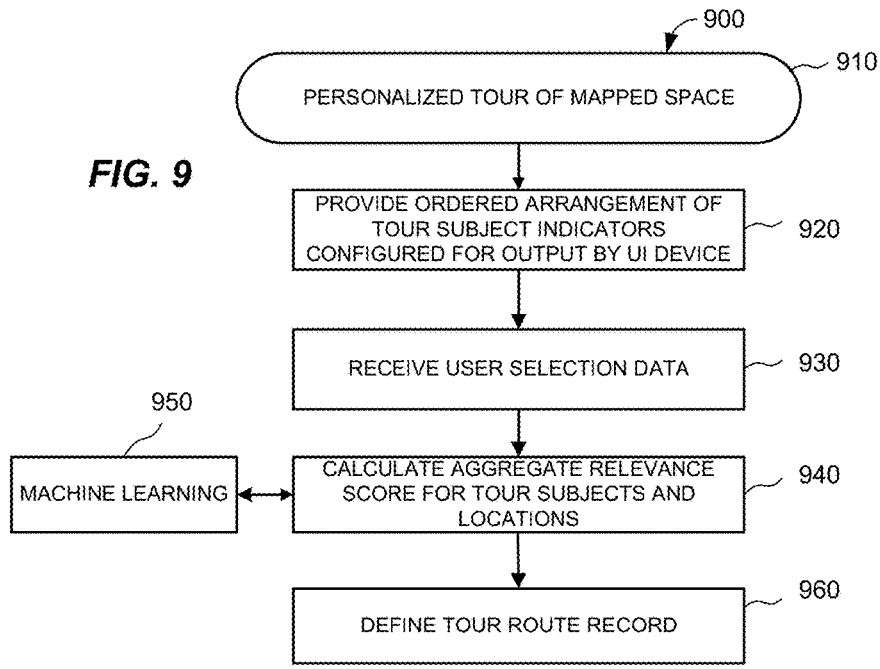
FIG. 9 is a flow chart illustrating high-level aspects of a method for configuring a customized tour of a mapped space.

FIG. 9 illustrates an overview of the methods 900 for preparing and optimizing a customized tour of a mapped space, which may include related operations in any functional order or in parallel that may be performed by one or more processors (e.g., 202, 214, 302, 310). References will also be made to (elements appearing in) preceding FIGS. 1-8 and to elements referenced in the subsequent FIG. 10 in discussing FIG. 9.

Figure 10:
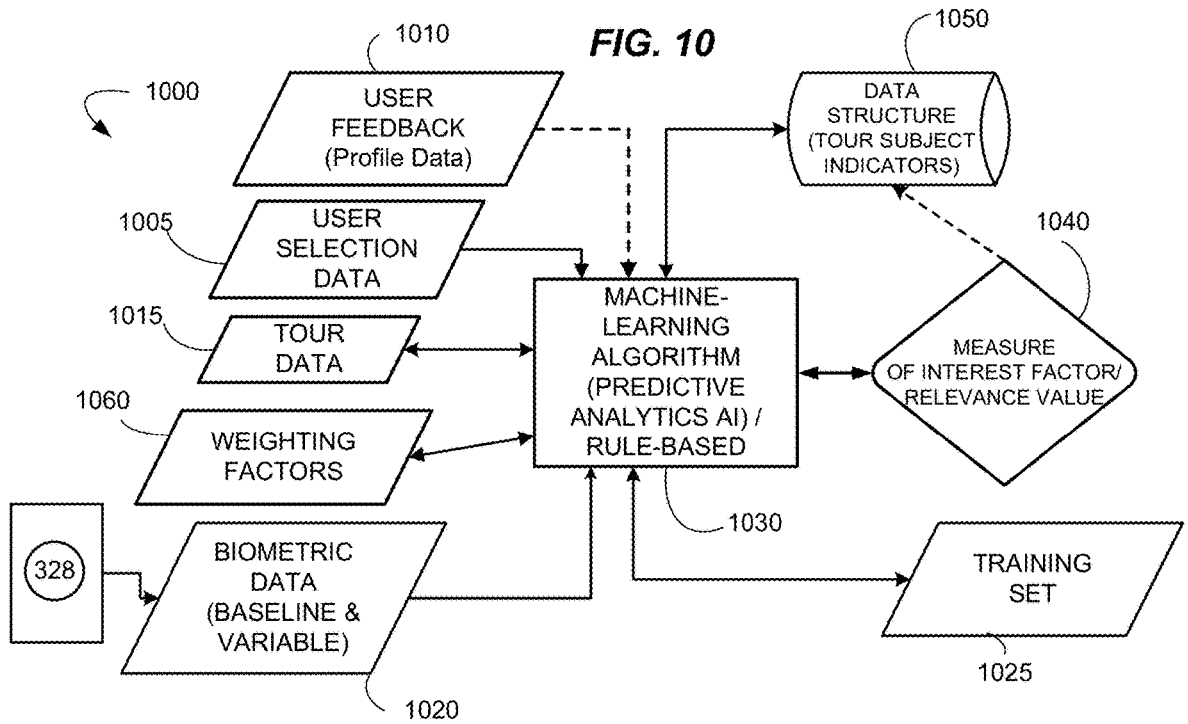
FIG. 10 is a block diagram illustrating high-level aspects of a system or apparatus for configuring a customized tour of a mapped space.
Figure 11:
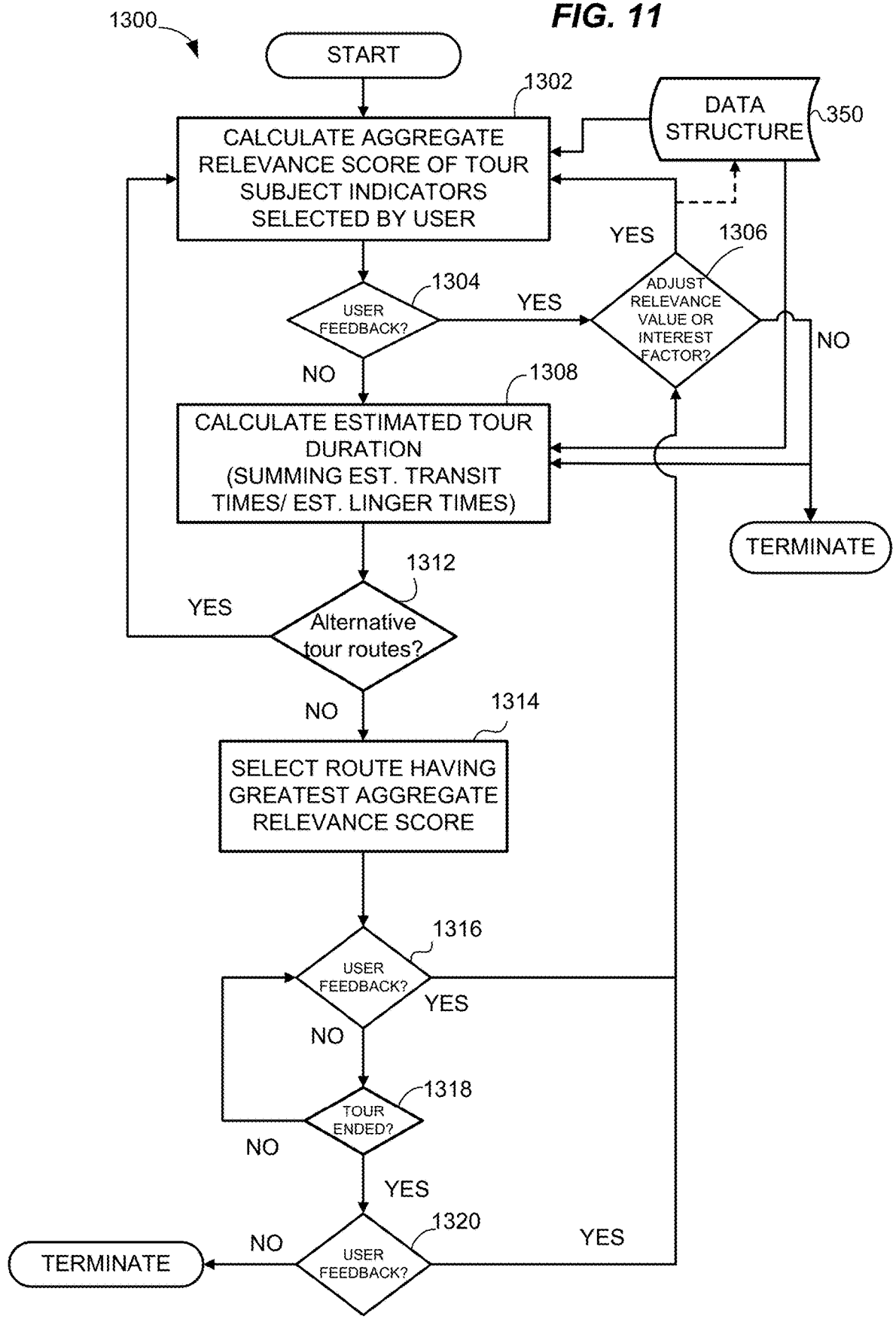
FIG. 11 is a flowchart showing an algorithm for defining at least one tour route record comprising an ordered list of locations being a lesser subset of all locations in the mapped space.
Figure 12:
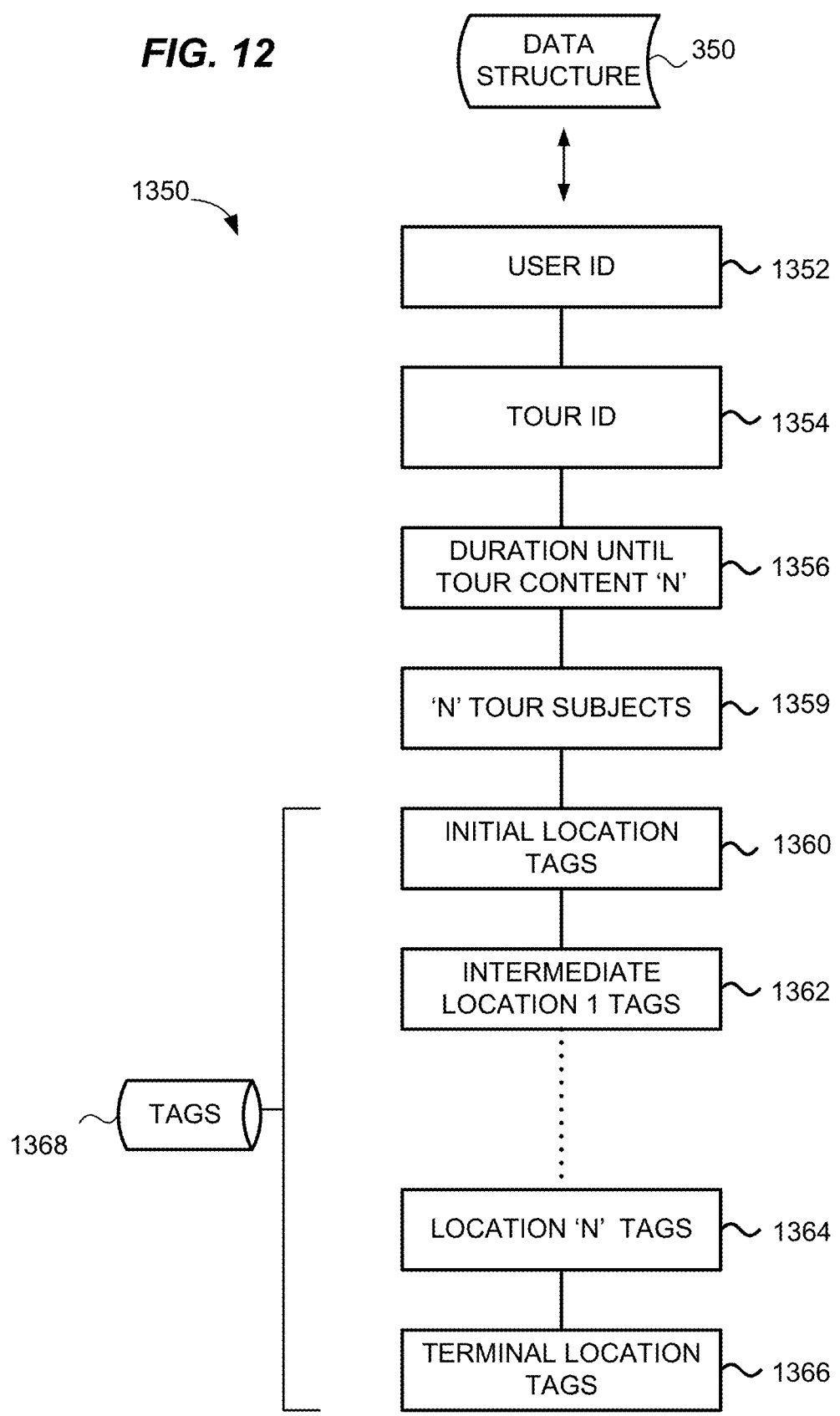
FIG. 12 is a schematic block diagram illustrating a data structure for use by one or more processors for associating tour subject indicators.

A customized tour optimization method begins at process 910, when one or more users (330: FIG. 3B) are detected as having initiated participation in a tour (e.g., 500: FIGS. 4 and 5), for example, by a user 402 touching a screen 403 for making selection of tour subject indicators (See FIG. 4A). In some embodiments, the processor accesses a database (e.g., any one or more of 116, 122, 124, 126, 128, 220, etc.) including tour subject indicators for the tour upon detecting the user. In some embodiments, the processor receives signals indicating user profile data (e.g., 700: FIG. 7; 1010: FIG. 10) and tour data (e.g., 1015: FIG. 10) of the user or users participating in the tour.

At the process 920, one or more processors provide an ordered arrangement of tour subject indicators (e.g., nodes in 400 such as 411-413, 441, etc.) configured for output by a user interface device (e.g., 403: FIG. 4A; 120: FIG. 1). In an aspect, each of the tour subject indicators is associated by an electronic data structure (e.g., 400) to a relevance value (e.g., 451-459) for one or more locations (e.g., 431, 432, 433) of the mapped space 401 (FIG. 4A) and to content (e.g., 441-443) about a subject indicated by the tour subject indicator for delivery at corresponding ones of the one or more locations (e.g., 431-433, and other locations in mapped space 401). In an aspect, the relevance value indicates a degree of relevance of each location of the one or more locations to the each of the tour subjects.

In some implementations, the user profile may include digitally encoded data bits concerning affinity information related to the user, such as: the user's favorite celebrities, favorite movies or television shows, fictional characters or amusement rides; social graph, status or topic for a meeting or social event preparation; activity level or likes/dislikes for outdoor activity; favorite teams or players (e.g., professional sports teams/players, fictional teams/characters, etc.); favorite artists or songs; preferred merchandise and shopping style (e.g., cartoon character goods, or shopping at a particular retail store, etc.); culture; age; personal interests; and interactive content preferences (e.g., for holiday, season, religion, etc.), and the like.

In some aspect, the one or more processors at a tour optimization server (e.g., 104, 105, 106, 131, 200, etc.) may maintain a data structure holding an ordered arrangement of tour subject indicators associated to content components for tour subjects. The data structure may be of any useful type, for example as described herein above in relation to FIG. 3C. In an aspect, the content may include an interactive and/or defined narrative such as audio video clips explaining the significance of a tour location to a subject of interest, or digital data for generating customized content in real time. The data structure may further include an ordered arrangement of components for the tour content.

The profile data 700 and the tour data 1015 may be received or retrieved from one or more of the servers 104, 105, 106, 131, 200, and the like. In some aspect of the present disclosure, the sources of the user profile 700 and tour data 1015 may include another server, or from an application (or "app"), or from a third-party server. For example, the source may be a server or an application from a tour company.

In an aspect, the tour data 1015 may include data bits representing one or more of the purpose of the tour, tour locations/destinations, an estimated tour duration, estimated transit times between each location, estimated linger times at each location, predetermined delivery period for the content for delivery at each location, availability/accessibility of the location, and scheduled use of the locations (e.g., by one or more prior tours). The tour data may contain information representing geospatial locations of one or more data targets, and may include, for example, positional coordinates such as the latitude, longitude, and height relative to an ellipsoidal Earth model as may be provided by a satellite-based radio navigation system such as the Global Positioning System (GPS), street address, name (e.g., landmark or building names such as the Sound Studio 7, Warner Bros. Studio, Yosemite National Park, Half Dome, San Francisco Golden Gate Bridge, Stanford Shopping Mall, city names, etc.), street view (e.g., Street View™ available on Google Maps™, etc.), and the like of the data target.

At the process 930, the method may include receiving from the user interface device, user selection data from a user indicating a lesser subset selected from the ordered arrangement of tour subject indicators. In one aspect, a user uses her user interface device 120 (e.g., smartphone) communicably connected to the tour optimization server 200 to participate in a tour 500 of a mapped space 400 using a tour app to take a tour (e.g., by media cart 110, by foot, on a rideshare, any other suitable transportation means, or a combination thereof) to select a lesser subset of tour subjects within the mapped space. As part of communicating with the tour optimization server 200, user profile data 1010 and/or tour data 1015 may be collected from the smartphone by the processor 202, 214, 302, or 310. For example, at least the tour destinations and timing (tour start time, location durations, and estimated or actual end time) may be collected. In other embodiments, the user profile 1010 and/or tour data 1015 may be collected or inferred from input by the user via U/I 324, or from available information on the internet including social media information pertaining to the user (e.g., social media accounts, etc.). In certain embodiments, user profile 1010 may include data bits that signify mood (discussed in more detail below), desired tour experiences, user watchlists or alert lists, news and current events, and other information of evident interest. Similarly, the user profile 1010 and tour data 1015 may be collected with respect to any of the other users associated with other user interface devices 120 (involving other use examples, for example, where a group of users such as friends or family are participating in the same or tandem tours) using similar or other means that may be appreciated by those having ordinary skill in the art.

At the process 940, the method may include calculating an aggregate relevance score for the lesser subset of tour subject indicators and locations of the mapped space. For example, calculating an aggregated relevance score includes the processor performing an aggregating function over a set of values (tour subject indicators), such as "GROUP BY" in SQL, or "avg( )" in Cypher. Other suitable aggregating functions may be used, for example, those which are discussed by Neo4j, Inc. (San Mateo, Calif.) at https://neo4j.com/docs/cypher-manual/current/functions/aggregating/index.html. In an aspect, the calculating includes aggregating edge values of a graph database linking the lesser subset of tour subject indicators to the locations of the mapped space, wherein nodes of the graph comprise the tour subject indicators. In such case, for example, the processor may calculate the average of multiple relevance scores for the lesser subset of tour subject indicators and the locations of the mapped space. In another aspect, the method may include calculating an estimated tour duration based on the ordered list of locations, at least in part by summing estimated transit times between each location and estimated linger times at each location. For example, in an aspect, the method may further include estimating the estimated linger times at the each location at least in part based on a predetermined delivery period for the content for delivery at the each location.

Figure 13:
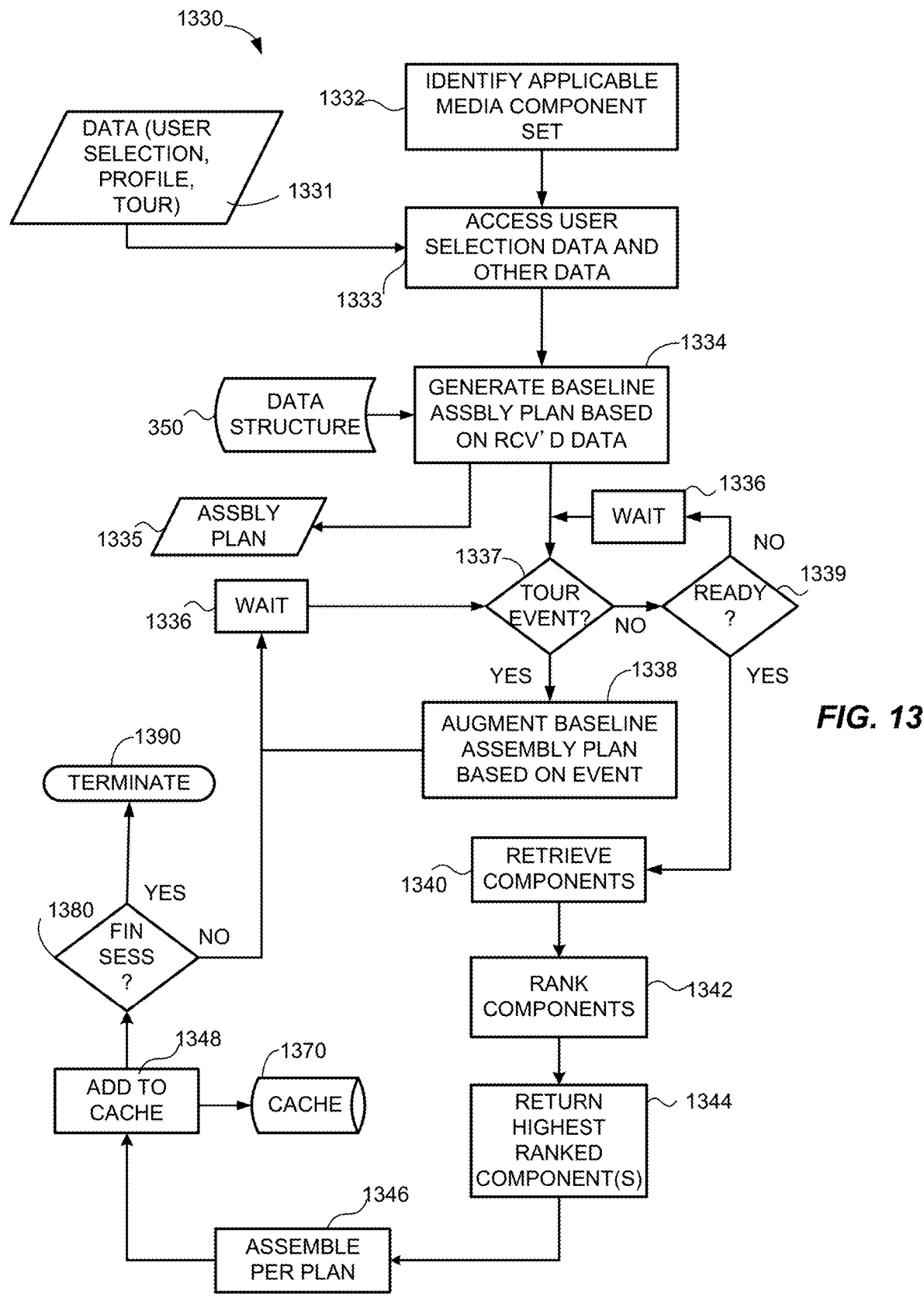
FIG. 13 is a flow chart illustrating aspects of defining by one or more processors at least one tour record comprising an ordered list of locations being a lesser subset of all locations in the mapped space.

The one or more processors at process 940 may use a customized tour optimization algorithm 1030, which may be a rule-based algorithm, a predictive analytics (AI) algorithm (tour content AI), or a combination of both, to calculate aggregate relevance score for tour subjects and locations. Further details of the structure and operations of the customized tour optimization algorithm 1030 are discussed below with reference to FIGS. 13A-13C.

In some embodiments, the method 900 executed by the one or more processors running the customized tour optimization algorithm responds to user feedback, such as biometric data indicating a neurological response, words uttered or intents otherwise expressed (e.g., via text input or intentional gestures) by one or more users and detected by the user interface devices 120 via the U/I 324, microphone 314, sensors 328, etc., and modify at least one tour record during the tour. For example, a user 402 (Amy) taking a tour 500 while riding a media cart 460 equipped with a virtual display device 480, 485 may utter a voice command, "Skip 'Show 'B' Stage' Spiel during the middle of the tour while listening to the spiel at Sound Stage 15 (node 432), because she found it boring. In response, the customized tour optimization process may modify the tour record, by, for example, ending "The 'Show 'B'" spiel abruptly or early, or substituting it with a shorter version of the spiel.

At the process 950, the one or more processors may process the user feedback from the one or more users by a machine-learning algorithm such as the predictive analytics algorithm 1030 to predict elements of the tour content likely to appeal to the detected user(s), and/or to configure mood-sensitive content for the tour 500, which may be looped back to the process 940 to further refine the process of calculating the aggregate relevance store for tour subjects and locations. For example, the processor at process 950 may use a predictive analytics algorithm to correlate biometric data for a user, or her cohort(s) in the group of users sharing the tour, to an neurological indicator. It should be noted that instead of or in conjunction with the biometric data 1020, any one or more of the passenger profile data 1010, preference criteria 750, and trip data 1015 may be used, and instead of or in conjunction with the neurological indicators 1040, other sensory data detected by sensors 328, or data input by a user (passenger) via U/I 324 or 314 and the like may be used. For example, the predictive analytics algorithm may be configured to process context-indicating data in addition to biometric data, which may improve accuracy. Context-indicating data may include, for example, user location, user position, time-of-day, day-of-week, ambient light level, ambient noise level, and so forth. For example, if the user's context is full of distractions, biofeedback data may have a different significance than in a quiet environment.

At the process 960, the one or more processors defines a tour route record, which records a plan for the tour and subjects to be covered during it. The record may be in human-readable format, machine reachable format, or both. To define the record, the processor may operate an algorithm that receives the aggregate relevance scores from upstream process 940 and determines a tour route that optimizes the utility of the tour for the tour group, in view of current resources. The algorithm may include determining current limitations on the tours, including availability of locations and time limits, and finding a highest-scoring tour that can operate within the determined resource constraints. A more detailed example of an algorithm is described herein below in connection with FIG. 14.

The method 900 may select from alternative tour content, based on comparing neurological indicators to a targeted response for the user(s). A participating control node may make predictions using machine learning tools to predict tour content elements likely to produce a targeted neurological state in the user or cohort. Once making the prediction, the control node selects the content scored as most likely to produce the targeted response. In addition, or in an alternative, the control node may select tour content based on a user's direct input, for example by weighing direct input together with neurological indicators. Direct user input may include, for example, spoken or texted verbal input, input from a biometric sensor 328a or other sensors (e.g., 328c), bodily movement detected by a camera array 328b, or selection of control links in a user interface device 120.

In an optional aspect, a processor may alter tour content to keep tour users engaged. For example, content alterations for engagement at a basic level involve changing the music and SFX volume/mixing to re-engage. Brightness of the screen may also be adjusted. In some implementations, mood-sensitive content components may include scary or violent contents that form a part of the tour content, and such contents may be cut, censored, or deselected as part of customized tour optimization process 900 when the users include small children and the biometric data collected from the users indicate fear or aversity. Alternate segments may be identified and stored in a database described herein for this function.

As shown in FIG. 10, a system 1000 for configuring a customized tour of a mapped space may use a customized tour optimization process 1030, e.g., a predictive analytics algorithm using artificial intelligence (AI) to detect correlations between tour subject indicators and one or more locations of the mapped space and content about tour subjects. Predictive analytics, including machine-learning algorithms sometimes referred to as artificial intelligence (AI), can be an efficient tool for uncovering correlations between complex phenomena. The customized tour optimization process 1030 may receive user selection data 1005, user feedback/profile data 1010, and/or tour data 1015 that may be time-correlated to the biometric data 1020 from client devices (e.g., user interface devices 120, clients 300, and the like). The data may be associated with a specific user or cohort in the group of users participating in the common tour, or the data may be generic. Both types of input data (associated with a user/group and generic) may be used together. Generic input data can be used to calibrate a baseline for neurological response, to classify a baseline neurological response to a location or arrangement of tour subjects including tour content elements. If most users exhibit similar biometric tells when viewing or experiencing tour content within the tour context, the tour content component can be classified with other components that provoke similar biometric data from users. The similar tour content components may be collected and reviewed by a human tour curator, who may score the components on neurological indicator metrics 1040 manually, assisted by automated analysis tools. In an alternative, the measure of user interest factors/relevance value 1040 can be scored by human and semi-automatic processing without being classed with similar components. These human-scored elements become training data for the predictive analytics process 1030. In some embodiments, humans scoring elements of the tour content may include the users, such as via pot-tour surveys, reviews, etc. In some aspect, scoring should consider cultural demographics and may be informed by expert information about responses of different cultures to scene elements.

The predictive analytics process 1030 is optional. If used, it compares human and machine-determined scores of components or other tour content elements and uses iterative machine learning methods as known in the art to reduce error between the training data and its own estimates. Analysts may score data from multiple users and vehicle trips based on their professional judgment and experience. Individual users may score their own content. For example, users willing to assist in training their personal "tour software" to recognize their neurological states might score their own feelings (e.g., interests, affinities or dislikes) or the relevance of produced content to tour information while consuming the tour content. A combination of these and other approaches may be used to develop training data for the predictive analytics process 1030. Once the process has learned correlations for a passenger or group of passengers, it is ready to apply its learned correlations during real-time content consumption.

FIG. 13A shows aspects of an algorithm or method 1300 for calculating an aggregate relevance score for the lesser subset of tour subject indicators and locations of the mapped space. At 1302, the processor may calculate an aggregate relevance score for the lesser subset of tour subject indicators selected by user, and locations of the mapped space. As used herein, "aggregated relevance score" may include an average of the relevance scores that may be derived by a defined procedure or function of that may be operable with respect to a given database, such as AVG( ) in Cypher. In an aspect, the process 1300 may retrieve relevance scores of all tour subject indicators and take an average thereof. In an aspect, calculating may include aggregating edge values of a graph database linking the lesser subset of tour subject indicators to the locations of the mapped space, wherein the nodes of the graph comprise the tour subject indicators as explained in connection with FIG. 4A.

At 1304, the processor may determine whether user feedback is received from the user before or during completing at least a portion of a tour following a tour route record. Optionally, user feedback may include biometric data as described elsewhere herein. If the user feedback is received, at 1306, the processor may determine whether at least one of the relevance value or interest factor based on user feedback received before or during completing at least a portion of a tour following the tour route record should be adjusted. For example, the user feedback may be a biometric data indicating continued satisfaction with the tour or the tour content being presented or recommended to the user, in which case the interest factor or the relevance value may stay the same. In another aspect, the user feedback may be such that it indicates that the user is not satisfied or otherwise happy with the tour content being presented or recommended to the user, in which case the interest factor or the relevance value for the tour content may be reduced. In another aspect, the user feedback may be such that it indicates that the user is highly satisfied or otherwise very happy with the tour content being presented or recommended to the user, in which case the interest factor or the relevance value for the tour content may be increased. When the interest factor or the relevance value is changed (e.g., reduced or increased), the change may be reflected in the data structure 350, and the process may loop back to 1302. And, as further discussed below with respect to FIG. 13C, the tour route record may be modified by the processor based at least in part on the user feedback during the tour.

At 1308, the processor may calculate an estimated tour duration based on the ordered list of locations. In an aspect, the estimated tour duration may be calculated at least in part by summing estimated transit times between each location and estimated linger times at each location. In an aspect, the estimated transit times between each location and estimated linger times at each location may be retrieved from the data structure 350.

At 1312, the processor may determine whether alternative tour routes exist, by calculating aggregate relevance scores for other possible tour routes and determining whether any of the aggregate relevance scores satisfy a minimum aggregate relevance score constraint and a maximum tour duration. For example, referring back to FIG. 4A, in an aspect, the minimum aggregate relevance score constraint may be configured as "90%," in which case the processor may eliminate candidate locations (and contents about tour subjects) that are ranked below 90% in relevance value, e.g., 457-459, and 499, particularly if the average of the relevance scores would fall below 90% for the possible tour routes including such candidate locations (and contents about tour subjects). In another example, in case of the user 402 (Amy), whom the processor has determined as being interested in Film 'A' (e.g., from stated interest indicated by Amy, or as determined by the customized tour optimization Algorithm/AI, etc.), the processor may calculate an alternative tour route that includes nodes (locations and/or contents) 422, 411, 431, and 432, but may exclude other nodes. Further, suppose the minimum aggregate relevance score constraint is set at "90%" as in the previous example, and the maximum tour duration is set at "2 hours," for example, by user preference or input. In an aspect, if the aggregate relevance score for just-described the tour route for Amy satisfies the minimum aggregate relevance score constraint and the maximum tour duration (e.g., the tour is estimated to take only 90 minutes), then the foregoing tour route is determined as one of the viable alternative tour routes (e.g., "Amy's tour route," a selected route). Furthermore, suppose that another alternative tour route includes, in addition to Amy's tour route, a node 443. Such alternative tour route would not have the greatest of aggregate relevance scores determined by the calculating ("Amy's alternative tour route")

At 1314, the processor may select a selected route from the alternative tour routes based on the selected route having a greatest of aggregate relevance scores determined by the calculating. For example, Amy's tour route may be selected as the selected tour route instead of Amy's alternative tour route, in the examples described above.

At 1316, the processor may again determine whether a user feedback is received from the user before or during completing at least a portion of a tour following a tour route record in a manner similar to process 1304 above.

At 1318, the processor may determine whether the tour is ended/completed, for example, by determining whether the estimated or allotted tour duration has passed, whether the tour guide has announced conclusion of the tour, whether the user(s) has indicated conclusion of the tour, whether the media cart(s) carrying the user(s) have reached a predetermined tour terminal location or otherwise become unavailable for tour use, etc. If the tour is not ended, the process may loop back to 1316.

At 1320, after the tour is ended, the processor may determine whether a user feedback is received from the user before or during completing at least a portion of a tour following a tour route record in a manner similar to process 1304 above. However, this time, the user feedback is not directly reflected in the tour route (locations and/or contents), and instead, the user feedback may be used by the processor to optimize a future tour for the user.

FIG. 13B shows an example of a data structure 1350 for use by one or more processors for defining a tour route record including an ordered list of locations being a lesser subset of all locations in the mapped space that satisfies at least a minimum aggregate relevance score constraint and a maximum tour duration constraint, including a user-perceivable characteristic, for example a tour subject, content about a tour subject, a location, visible place/set, character or object appearing in or referenced by the tour content component, or a duration of play of the tour content component with a tour data, for example an estimated tour duration based on the ordered list of locations, estimated transit times between each location, estimated linger times at each location, a change in estimated time remaining until arriving at, or user selection of, a destination, an origin, or an intermediate location along the route, predetermined delivery period for the content for delivery at each location, availability/accessibility of locations, scheduled use of the locations (e.g., by one or more prior tours), etc. Elements of the data structure 1350 shown in FIG. 13B may be linked to any tour subject identifier by a data structure 350 as shown in FIG. 3C, or equivalent data structure having elements corresponding to one or more of the elements 1352-1356. The elements 1359-1366 may be generic with respect to any particular tour or user (or a group of users), and so may be used to correlate a tour content component to multiple tours by multiple users. For example, a processor may correlate a tour content component with a duration of 15 minutes (i.e., a particular duration) and a semantic tag of "Sound Studio 7" (i.e., a particular semantic tag) in the data structure 350 to any tour by any user along a tour route that includes at least one destination tag of "Sound Stage 7" (i.e., a matching tag) involved in a tour in a media cart 110 with a duration of 15 minutes or longer. The data structure 1350 may be of any suitable type, for example as described in connection with data structure 350 (e.g., graph database) herein above.

The data structure 1350 may include elements pertaining to a tour and user or a group of users. A processor of a client device or server may set certain elements, for example, for each user or a group of users, the user ID 1352 tied to the respective profile data 700 (which may include interest factors/preference criteria 750), tour ID 1354 tied to the respective tour data 1015, and initial location name included in the initial location tags 1360 and a terminal location name included in the terminal location tags 1366, based on a tour requested by the user(s) (e.g., from a tour personalization application that may be executed and/or displayed on a terminal 403, or user interface devices 120, etc.). Other elements may be populated automatically by a server. For example, the customized tour optimization server may assign a unique tour ID 1352 for the dataset 1350.

The customized tour optimization server may plan one or more alternative tour routes based on information pertaining to tour subject indicators, including their relevance values associated to one or more locations of the mapped space or contents about tour subjects. In an aspect, the relevance values may be weighted by one or more interest factors of the user(s), where an interest factor indicates a user's level of interest in an indicated subject. In an aspect, the relevance values may be adjusted or change along the tour route(s). In addition, the customized tour optimization server may include affinity, user preference (past or present), user requests and other information in tour route planning. For example, with reference back to FIG. 4A, suppose the selected tour route for Amy (Amy's tour route) in the tour 500 includes the following nodes (locations/tour subjects/contents) in the graph database: 411, 422, 441, 423, 431, 432, and 433. The processor may tag tour locations and contents about tour subjects along the route in tags 1368. Based on the tagged nodes, the customized tour optimization server may pick a non-zero integral number 'N' of tour subjects and add their names and location information (e.g., geolocation coordinates or addresses) to the data structure 1350 at elements 1362-1364. To pick the intermediate locations, the server may select from a list of places or tour subjects by filtering against expressed or implied preferences of the user(s), subject to the constraints that the added tour time should not be more than an allotted time. In an alternative, or in addition, the server may calculate a most favorable route using a predictive analytics algorithm trained over a set of tour and interest data. Once picking the most favorable route, the server may populate the relevant elements 1362-1364.

In addition to name and geographic location of any tour elements 1360-1366, the server may add other semantic tags relating to the tour subjects, for example from a database of tags or other source. In a similar manner, the server may assign any tag relevant to both the tour locations and contents and to the user preferences or affinity data.

The tour subject element 1359 defines one or more locations or visible places relevant to each location elements 1360-1366. The location or visible places include any object, item, building, structure, landscape, landmark, film studios, filming locations, stores, restaurants, etc., identified by the server or a client device to occur or exist with respect to an intermediate location along the route of the tour 500 at a particular time. The "duration until tour content" element 1356 is of high interest to production of customized tour, which is a forward-looking operation unconcerned with the past. To prepare and optimize the customized tour in real time, the server needs to know how much time will pass until the tour reaches its final destination or passes an intermediate location for which the server will select one or more tour content components. Tour contents or events may include, for example, media contents and scripts ("spiel") such as Article 443, "The Show 'B' Stage" Spiel 442, for which content durations are predetermined and known, for which estimated content durations and in turn the overall tour duration can then be calculated at any point along the tour route. Duration until other tour subject 1356 may change during travel (e.g., due to weather or traffic conditions, or how long the actual tour contents may take to complete by, e.g., a human tour guide), and may be updated in the data structure 1350 as tour progresses.

Tour subjects can apply to specific identified places or to a changing set of the locations based on progress of tour. For example, referring back to FIG. 5, at the beginning of the tour (e.g., Amy's tour route 500), the server may calculate "Subject A" for intermediate Location X1, "Subject B" for intermediate Location X2, and "Subject n" for intermediate Location Xn for the remaining destination until the tour terminal location Xz and add each location and tour content durations (estimated or actual) including transit times and linger times to the data structure. The server may refresh the duration element 1356 during a tour, periodically and/or in response to occurrences of tour subjects. For example, once the tour has departed Location X1, the server may calculate the linger time of the prior tour lingering at the next tour location (e.g., X2), or a transit time to Location X2 (e.g., in light of the tour location X2 suddenly facing an announced technical problem and about to become unavailable as a tour destination during the remainder of the tour duration for Amy's tour), and recalculate the "arrive at" duration for the remaining destinations. In between triggering events such as lingering times at intermediate locations and availability of tour locations, the server may update the "duration until" element periodically, for example, every 5 or 10 seconds. In addition, the server may change, add, or remove intermediate locations and add or remove semantic tags associated with each location or tour contents, as the tour progresses based on user input, biometric data, traffic data, invitation and/or addition of additional users or tour groups (in case of tandem tours) to join the tour, and any other new available information. Thus, the data structure 1350 can be updated and support dynamic configuring, assembling and producing of the customized tour and tour contents during tour 500.

Based on the information as described in connection with data structures 350 600, 700, 750, and/or 1350, a server may assemble tour content for use during a tour. For example, FIG. 13C shows a method 1330 for assembling by one or more processors tour content from a set of media components based on tour subject information. At 1332, the processor may identify an applicable media component set for a tour based on interest factors or personal affinities of the user or a group of users. For example, based on one or more records (e.g., in the user profiles) stating the user loves romantic or romantic comedy shows or movies and prefers to see related tour contents, the server may filter out identifiers for non-pertinent content components from its library or knowledge graph of all available content components. At 1333, the server may access user selection data and other data, for example by accessing data 1331 and identifying a user ID, tour ID, and user's indication of a lesser subset of tour subjects selected from the ordered arrangement of tour subject indicators, for locating pertinent tour information in a data structure 1350 (FIG. 13B). At 1334, the server may generate a baseline (e.g., initial) assembly plan based on the tour data 1331, which may be contained in the data structure 1350. The server may generate the plan based on the tour origin, destination, preferred tour subjects, and other criteria as described elsewhere herein. The plan 1335 may include a sequence of tour locations and tour contents with or without other media components, arranged in a list or other useful data structure.

At 1337, the server may determine that a new tour event defined in the data structure 1350 has been detected by the processor, for example by tracking progress of the media cart along its tour route. If the tour event is detected, the server may update the assembly plan 1335 based on the tour event. Tour event may include a user input (e.g., biometric data 1020: FIG. 10) via sensors 328, 402, etc., or via U/I 324. For example, periodically, the grades or relevance values for the linkages in the electronic data structure (e.g., 350, 1050) such as the graph database may be adjusted based on the choices the users (tour guests) and other people make. In an aspect, for example, post-tour surveys, reviews, or curating may change these grades. Thus, the processor may "learn" from the users and other participants who may access the electronic data structure of the customized tour optimization process or method of the present disclosure.

Although not shown in FIG. 13C, the augmentation process 1338 may use the most recent copies of the data structures 350, 1350 available. For example if an intermediate location or tour subjects of the existing tour data is deleted or changed as a result of the new tour data or tour event, the server may remove contents/components picked for a deleted location or tour subject, add components picked for the new location or tour subject, and if a preference data is deleted or changed via user feedback or input, the server may remove contents/components picked for a deleted preference, add contents/components picked for the new preference; the server may then adjust contents/components based on changes in estimated durations. At 1336, the server may wait for the next tour event to occur. If at any time or times while waiting 1336 the server determines, at 1339 that it is ready to assemble and produce the tour content for presentation in the tour, at 1340 it may retrieve the tour content components for assembly, rank components for relevance at 1342, and return highest ranked component(s) at 1344. The processor may rank components using the customized tour optimization algorithm discussed above and herein. Then at 1346 the server may assemble the components into the tour content or portion(s) of the tour content, for example by arranging segments of media in a sequence and/or rendering a media component (e.g., a model) to produce a media segment.

At 1348, the server may add the assembled contents/components to a cache 1370 for delivery to the user of the tour. Content in the cache may be streamed or delivered in periodic packages to a user interface device on the user's person or in the media cart of the tour, and thus, produced for consumption in real time. Once delivered, the server may delete delivered content from the cache 1370, immediately after delivery, immediately after the tour is completed, or at some later time. At 1380, the server may determine whether the tour session is completed, for example in response to termination of the tour or termination of the session by the user(s). Once finished, the server may terminate 1390 the session.

Figure 14:
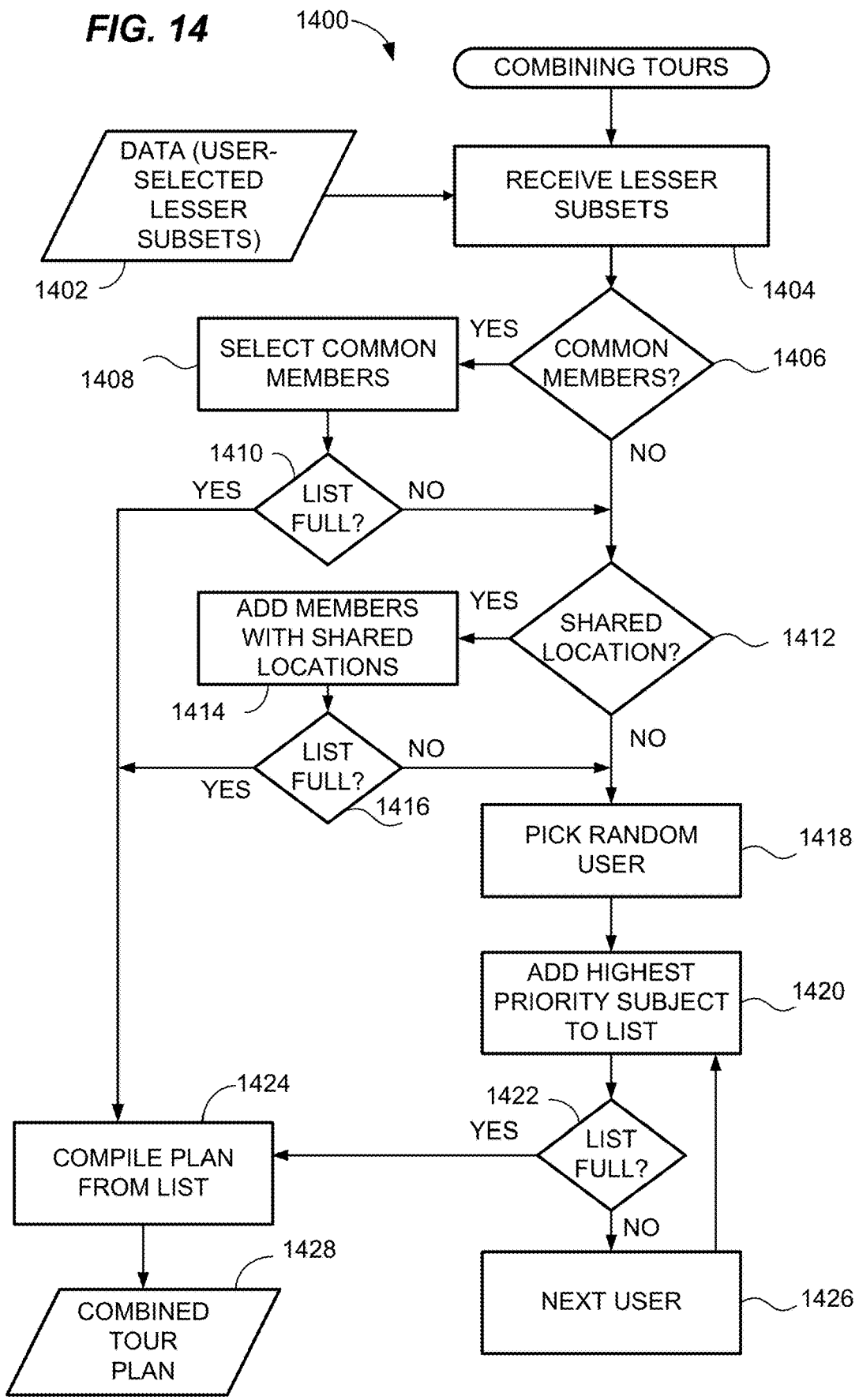
FIG. 14 is a flow chart showing an algorithm for combining two or more lesser subsets selected from the ordered arrangement of tour subject indicators each corresponding to a different user.

FIG. 14 shows an example of an algorithm 1400 for combining two or more lesser subsets selected from the ordered arrangement of tour subject indicators each corresponding to a different user, such as may be executed by one or more computer processors. At 1404, a processor receives two or more distinct lesser subsets 1402 selected by users. At 1406, the processor determines whether the subsets have any common members. If the subsets have common members (e.g., if all the users have made at least one identical selection), then at 1408, the processor adds one or more common members to a data structure (e.g., a list or database) for holding all tour subjects to be covered during the tour.

If the subsets have no common members, or if after adding the common members empty slots remain in the tour itinerary, at 1412 the processor may determine whether any of the subset members are associated with the same location or locations in the space to be toured. If any user-selected members relate to the same location, at 1414 the processor may add those members to the tour itinerary.

If the subsets have no members with common locations, or if after adding the members with common locations empty slots remain in the tour itinerary, at 1418 the processor may randomly pick a user from the participating users in the tour. In an alternative, the algorithm may prefer selection of users based on a scoring system; in other words, the processor may rank the participants in a priority order based on any appropriate factors. Factors may include, for example, price paid for the tour, credits or points earned from prior purchases or participation in sponsored activities, or other agreed-upon conditions for granting a preference.

At 1420, the processor adds the highest-priority subject of the selected user to the tour itinerary. If the user has not indicated any priority, the processor may select a subject randomly. At 1422, 1416 and 1410, the processor may determine whether the tour itinerary list is full, based on any applicable limit, e.g., time available for the tour, a maximum number of locations to be visited, or a maximum number of subjects to be included. When the list is not yet full, the process 1400 branches to the next process, e.g., to picking the next user at 1426, or another branch as shown in FIG. 14.

At 1424, the processor may compile a tour plan from the tour itinerary, including a sequence of locations to be visited and subjects to be covered at each location. The processor may generate the tour plan 1428 in a human-readable format, a machine-readable format, or both. In an aspect, the tour plan 1428 may include an address or other link for the content to be presented at each location, and navigation information for guiding the group to each location.

FIG. 15 is a schematic diagram showing features of apparatuses for configuring a customized tour of a mapped space, showing example aspects of an electronic tour guide. In an aspect, the media cart 110 includes a user 1511 (e.g., Amy 402), and a human driver 1541, who may be optional in case of the media cart 110 being an autonomous vehicle. In an aspect, the content corresponding to locations indicated by the at least one tour route record relevant to subjects referenced by the lesser subset selected from the ordered arrangement of tour subject indicators, which may be provided to the user during the tour 500 in the vehicle 110, may include a virtual presence component 1550 (or 1525). For example, one or more processors may enable a "tour guide" 1501 of a mixed reality application 1500 outside the media cart 110 to virtually present herself 1501a inside the media cart 110, using virtual presence equipment such as virtual presence cameras 1515, microphone 1525, a holoportation device 1545 (e.g., Microsoft Holoportation), and any other suitable virtual presence equipment communicably connectable to the one or more processors and the media cart 110 (not shown) that may be appreciated by a person skilled in the art. The virtual presence may be provided in real-time, or it may be pre-recorded. In another aspect, the passenger 1501 may be virtually presented as a passenger 1501b on a virtual display device 1535 (e.g., user interface device 480, 485: FIG. 4A) in the media cart 110 (e.g., 460), or a user's personal user interface device (e.g., smartphone). While not shown in FIG. 15, it should be appreciated that virtual presence may also work with respect to an individual such as a human tour guide (e.g., 470) inside the media cart 110 and virtually presenting herself outside the media cart 110, e.g., inside a different vehicle/media cart or another location outside the media cart 110, using holoportation technology such as the one described above. This way, the one or more processors may extend conducting a tour beyond physical confines of a single media cart 110, and a tandem tour comprising multiple media carts 110 may be provided by a single tour guide simultaneously.

Figure 18:
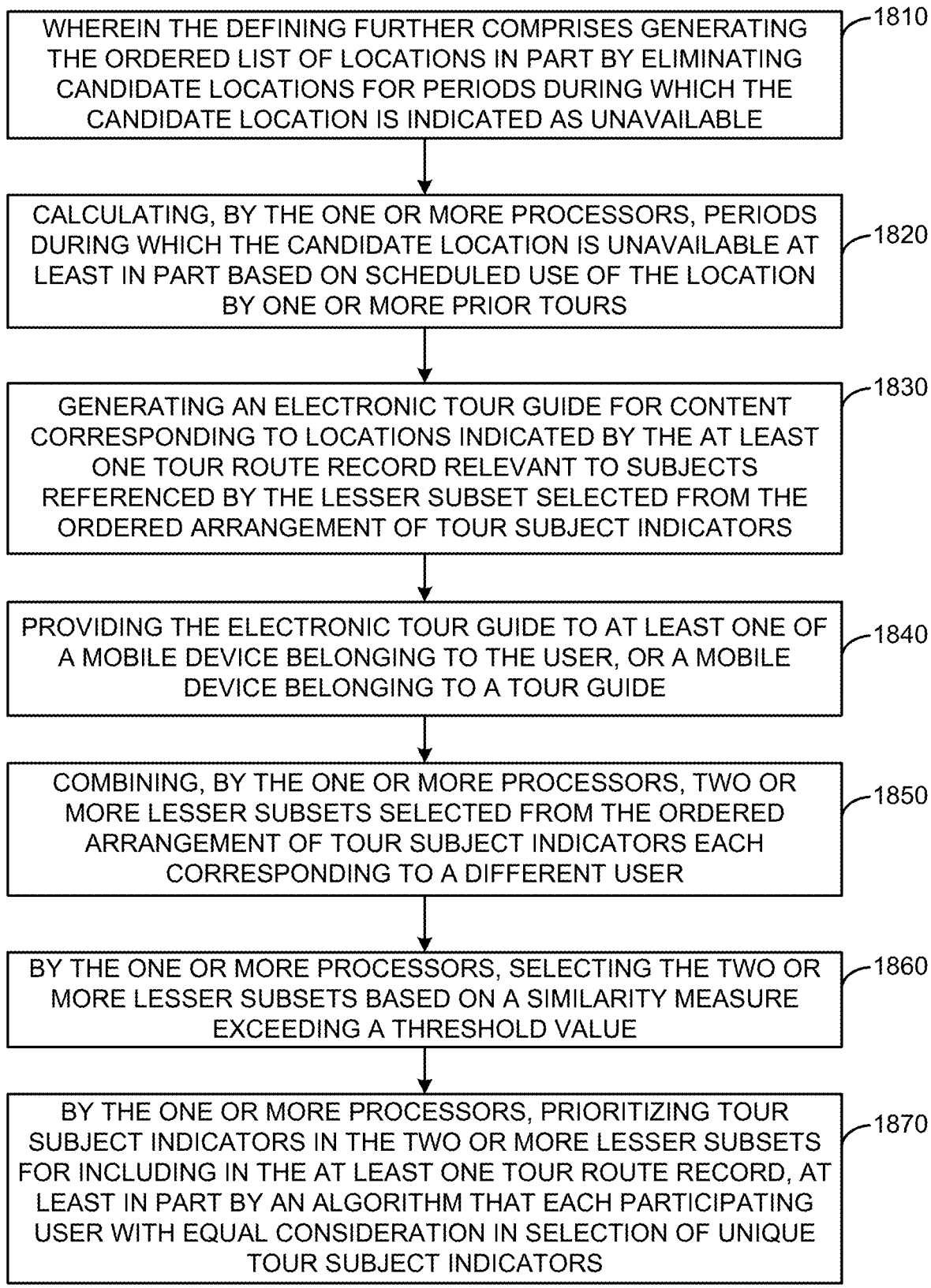
Figure 19:
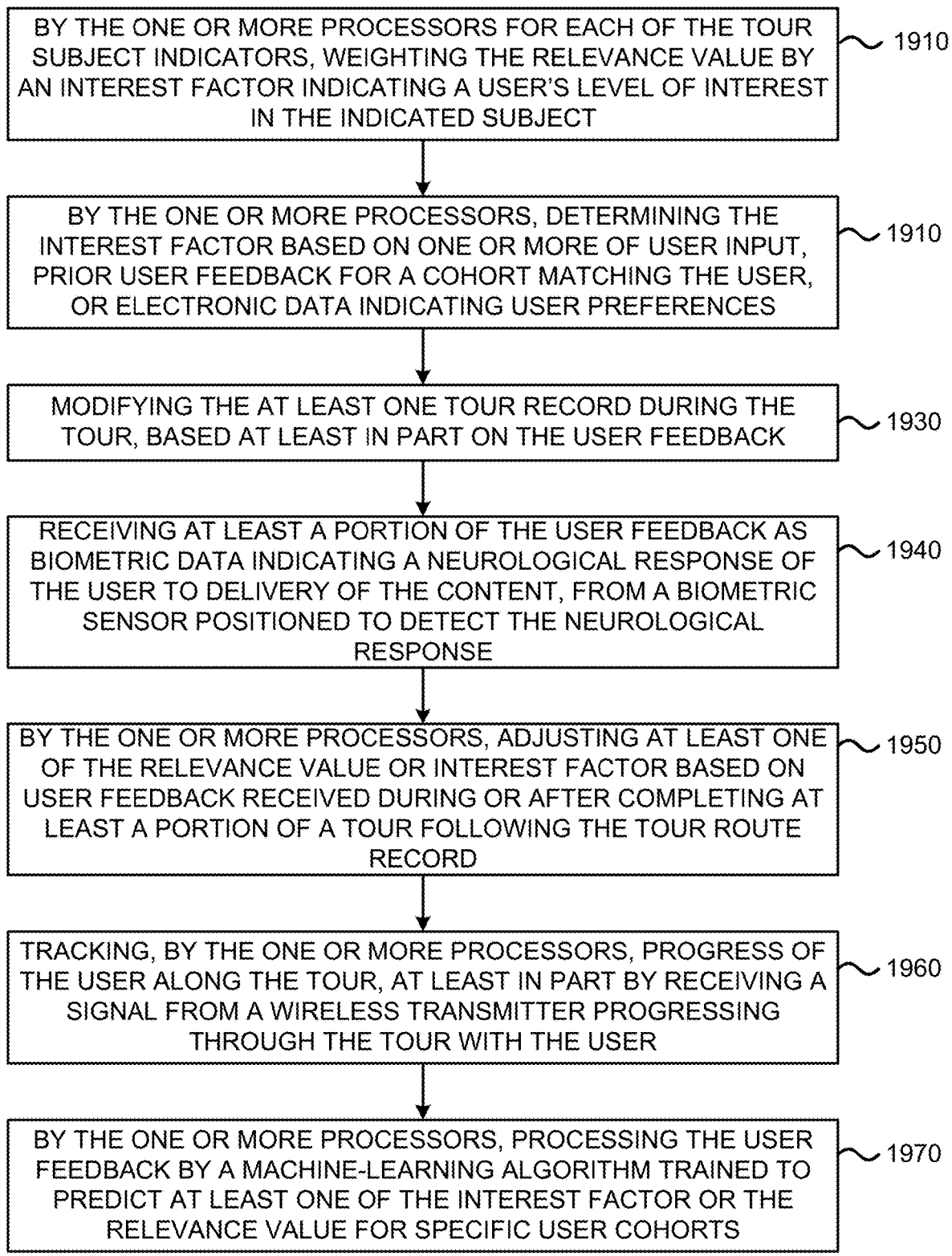

In accordance with the foregoing, FIG. 16 is a flow chart illustrating aspects of a useful automatic method 1600 for configuring a customized tour of a mapped space, for example, using an atmosphere of knowledge with graded linkages which learns from feedback from users, and FIGS. 17-19 are flow charts illustrating further optional aspects or operations 1700-1900 of the method diagrammed in FIG. 16. In an aspect of the disclosure, the method 1600 may be performed by one or more processors at a customized tour optimization server or other servers described herein, and may include other details described elsewhere herein.

At 1610, a processor provides an ordered arrangement of tour subject indicators configured for output by a user interface device. In an aspect, each of the tour subject indicators is associated by an electronic data structure to a relevance value for one or more locations of the mapped space and to content about a subject indicated by the tour subject indicator for delivery at corresponding ones of the one or more locations. In an aspect, the relevance value indicates a degree of relevance of each location of the one or more locations to the each of the tour subjects. For example, referring to FIG. 4A, in one aspect, the relevance value 451 between Film 'A' scene 441 and the movie, Film 'A' 422 is 94%, whereas the relevance value 453 between Actor 'ε' 411 and Film 'A' 422 is 95%, whereas the relevance value 454 between Film 'A' 422 and tour location 431 is 96%, and so forth. Other edge values 452 and 455-459 within the graph database 400 indicate the degrees of relevance of respective connected nodes. Relevance values are for example only, actual relevance values may differ.

At 1620, the processor receives from the user interface device user selection data from a user indicating a lesser subset selected from the ordered arrangement of tour subject indicators. For example, in an aspect, Amy (user 402) in FIG. 4A has selected node 441 "Film 'A' Scene."

At 1630, the processor calculates an aggregate relevance score for the lesser subset of tour subject indicators and locations of the mapped space. For example, in an aspect, the relevance score of Amy's selection of node 441 is 94% with respect to node 422 (Film 'A'), and the relevance score of Film 'A' to location 431 is 96%. Thus, in an example, the aggregate relevance score for Amy's tour route that includes nodes 441, 442, and 431 may be 95%, where AVG( ) is used to calculate the aggregate relevance score, or 85.7% if the edge values are multiplied.

At 1640, the processor defines at least one tour route record comprising an ordered list of locations being a lesser subset of all locations in the mapped space that satisfies at least a minimum aggregate relevance score constraint and a maximum tour duration constraint. For example, in an aspect, the processor may select "Amy's tour route" as described with reference to FIG. 13A above.

At 1650, the processor saves information defining the at least one tour route record in a computer memory for use in delivering a corresponding tour.

FIGS. 17-19 show additional operations 1700-1900 that may optionally be included in the method 1600 and performed by one or more processors performing the method 1600, in any operative order. Any one or more of the additional operations 1700-1900 may be omitted unless needed by a downstream operation and one or more of the operations 1700-1900 may replace one or more others of the operations of the method 1600. Any useful combination of operations selected from the group consisting of the operations 1700-1900 may be performed by one or more processors of an apparatus as described herein as an independent method distinct from other useful combinations selected from the same group.

Referring to FIG. 17, at 1710, the one or more processors perform the method wherein the calculating further includes aggregating edge values of a graph database linking the lesser subset of tour subject indicators to the locations of the mapped space, wherein nodes of the graph comprise the tour subject indicators, for example, as discussed with reference to FIG. 13A above.

At 1720, the one or more processors calculate an estimated tour duration based on the ordered list of locations, at least in part by summing estimated transit times between each location and estimated linger times at each location, for example, as discussed with reference to FIG. 13A above.

At 1730, the one or more processors estimate the estimated linger times at the each location at least in part based on a predetermined delivery period for the content for delivery at said each location, for example, as discussed with reference to FIG. 13A above.

At 1740, the one or more processors perform the method wherein the defining further comprises the calculating the aggregate relevance score for each of alternative tour routes satisfying the minimum aggregate relevance score constraint and the maximum tour duration, for example, as discussed with reference to FIG. 13A above.

At 1750, the one or more processors select a selected route from the alternative tour routes based on the selected route having a greatest of aggregate relevance scores determined by the calculating, for example, as discussed with reference to FIG. 13A above.

Referring to FIG. 18, at 1810, the one or more processors perform the method wherein the defining further comprises generating the ordered list of locations in part by eliminating candidate locations for periods during which the candidate location is indicated as unavailable, for example, as discussed with reference to FIG. 13B above.

At 1820, the one or more processors calculate periods during which the candidate location is unavailable at least in part based on scheduled use of the location by one or more prior tours. For example, in case of Amy's tour route, suppose the tour route includes location 431 registered as Location X1 in tour route records 600 and/or other data structure (e.g., 350, 1350, etc.), and further suppose that the tour duration requested by Amy is between 13:00 to 15:00. Further suppose that a prior tour that is occurring before Amy's requested tour time is scheduled to visit and use location 431 as part of that tour between 13:15 and 13:30. In such instance, the processor may calculate that location 431 is unavailable for Amy's tour between 13:15 and 13:30, but not between 13:00 to 13:15, and 13:30 to 15:00. Of course, additional times may be added or subtracted from this unavailability calculation, for instance, by taking into account estimated or actual linger times and transit times for the respective location/tour content.

At 1830, the one or more processors generate an electronic tour guide for content corresponding to locations indicated by the at least one tour route record relevant to subjects referenced by the lesser subset selected from the ordered arrangement of tour subject indicators, for example, as described with reference to FIG. 15.

At 1840, the one or more processors provide the electronic tour guide to at least one of a mobile device belonging to the user, or a mobile device belonging to a tour guide, for example, as described with reference to FIG. 15.

At 1850, the one or more processors combine two or more lesser subsets selected from the ordered arrangement of tour subject indicators each corresponding to a different user. Combination may occur using various algorithms. For example, at 1860, the one or more processors select the two or more lesser subsets based on a similarity measure exceeding a threshold value. An example is provided at 1400 of FIG. 14. For further example, the two or more lesser subsets may be lists created by different users of tour subjects they are interested in exploring during the tour. In an aspect, the similarity measure, as may be understood by a person of ordinary skill in the art, is a way of measuring how much alike two data objects (e.g., two or more lesser subsets of the tour subject indicators) are. Additional discussions about similarity measures is discussed in detail in Polamuri, Saimadhu, "Five Most Popular Similarity Measures Implementation In Python" http://dataaspirant.com/2015/04/11/five-most-popular-similarity-measures-implementation-in-python/, which is hereby incorporated by reference in its entirety. For example, in an aspect, if two different tour lists are similar enough, the two users should be grouped together on the same tour, otherwise they would take different tours. For a studio lot tour, whether the subjects concern the same location may be determined by the processor as the most heavily weighted factor in the similarity measure.

For further example, at 1870, the one or more processors may prioritize tour subject indicators in the two or more lesser subsets for including in the at least one tour route record, at least in part by an algorithm that provides each participating user with equal consideration in selection of unique tour subject indicators. For example, in the special case wherein available slots in the tour route are equal to, or an integer multiple of, participating users, the algorithm selects an equal number of unique tour subject indicators for each participating user. For example, if the available slots are less than the number of users, the algorithm may maximize the utility of the tour by selecting tour subject indicators on a democratic basis, in order of the number of users indicating each subject. Where an equal number of users indicate a greater number of subjects than available slots, the algorithm may randomly select tour subjects while preventing selections that award any user with more than one additional subject compared to other users. In an alternative, the algorithm may prefer selections based on competitive factors, for example price paid for the tour or credits earned from auxiliary activities, e.g., store purchases or participation in sponsored activities.

Referring to FIG. 19, at 1910, for each of the tour subject indicators, the one or more processors weight the relevance value by an interest factor indicating a user's level of interest in the indicated subject. For example, as discussed with reference to FIGS. 7A-7B, and 8 above.

At 1920, the one or more processors determine the interest factor based on one or more of user input, prior user feedback for a cohort matching the user, or electronic data indicating user preferences. For example, a cohort matching the user may be determined based on user affinity or interest factors of the user and the cohort.

At 1930, the one or more processors modify the at least one tour record during the tour, based at least in part on the user feedback, for example, as discussed with reference to FIG. 13C.

At 1940, the one or more processors receive at least a portion of the user feedback as biometric data indicating a neurological response of the user to delivery of the content, from a biometric sensor positioned to detect the neurological response. For example, in some aspects, the processor may monitor brain activity of a user with a user device. For example, a user device (e.g., configured as headwear) may incorporate an EEG, EMG, or another component capable of monitoring brain activity. In another example, the user device may receive brain activity data from a component capable of monitoring brain activity that is not incorporated into the user device. Detection of a neurological response may be as described in detail in international Patent App. No. PCT/US18/53614 which is incorporated herein by reference.

At 1950, the one or more processors adjust at least one of the relevance value or interest factor based on user feedback received during or after completing at least a portion of a tour following the tour route record.

At 1960, the one or more processors track progress of the user along the tour, at least in part by receiving a signal from a wireless transmitter progressing through the tour with the user.

At 1970, the one or more processors process the user feedback by a machine-learning algorithm trained to predict at least one of the interest factor or the relevance value for specific user cohorts.

Referring to FIG. 20, components of an apparatus or system 2000 for configuring a customized tour of a mapped space are illustrated, according to one embodiment. The apparatus or system 2000 may include additional or more detailed components for performing functions or process operations as described herein. As depicted, the apparatus or system 2000 may include functional blocks that can represent functions implemented by a processor, software, or combination thereof (e.g., firmware).

As illustrated in FIG. 20, the apparatus or system 2000 may include an electrical component 2002 for providing an ordered arrangement of tour subject indicators configured for output by a user interface device, wherein each of the tour subject indicators is associated by an electronic data structure to a relevance value for one or more locations of the mapped space and to content about a subject indicated by the tour subject indicator for delivery at corresponding ones of the one or more locations, wherein the relevance value indicates a degree of relevance of each location of the one or more locations to the each of the tour subjects. The component 2002 may be, or may include, a means for said providing. Said means may include the processor 2010 coupled to the memory 2016, the processor executing an algorithm based on program instructions stored in the memory. Optionally, the means may include one or more of a network interface 2011, a biometric sensor (array) 2014, an output port 2012, and a bus 2013. In an aspect, the tour subject indicators may be received from external systems via the network interface (not shown). Such algorithm may include a sequence of more detailed operations, for example, establishing a communication session with a customized tour optimization server, and at least one of streaming or pushing the tour subject indicators to the user interface device for output to the user.

The apparatus 2000 may further include an electrical component 2003 for receiving from the user interface device, user selection data from a user indicating a lesser subset selected from the ordered arrangement of tour subject indicators. The component 2003 may be, or may include, a means for said receiving. Said means may include the processor 2010 coupled to the memory 2016, the processor executing an algorithm based on program instructions stored in the memory. Such algorithm may include a sequence of more detailed operations, for example, establishing a communication session with a user interface device, and requesting and/or receiving the information about user selection of one or more tour subject indicators selectable by the user or users using one or more user interface devices. Optionally, the means may include one or more of the network interface 2011, the biometric sensor (array) 2014, the output port 2012, and the bus 2013.

The apparatus 2000 may further include an electrical component 2004 for calculating an aggregate relevance score for the lesser subset of tour subject indicators and locations of the mapped space. The component 2004 may be, or may include, a means for said calculating. Said means may include the processor 2010 coupled to the memory 2016, the processor executing an algorithm based on program instructions stored in the memory. Such algorithm may include a sequence of more detailed operations, for example, as shown in FIGS. 4A-4B including a machine-learning or rules-based algorithm.

The apparatus 2000 may further include an electrical component 2005 for defining at least one tour route record comprising an ordered list of locations being a lesser subset of all locations in the mapped space that satisfies at least a minimum aggregate relevance score constraint and a maximum tour duration constraint. The component 2005 may be, or may include, a means for said defining. Said means may include the processor 2010 coupled to the memory 2016 the processor executing an algorithm based on program instructions stored in the memory. Such algorithm may include a sequence of more detailed operations, for example, as shown in FIG. 13C including a machine-learning or rules-based algorithm. Optionally, the means may include one or more of a network interface 2011, a biometric sensor (array) 2014, an output port 2012, and a bus 2013.

The 2000 may further include an electrical component 2006 for saving information defining the at least one tour route record in a computer memory for use in delivering a corresponding tour. The component 2006 may be, or may include, a means for said saving. Said means may include the processor 2010 coupled to the memory 2016, the processor executing an algorithm based on program instructions stored in the memory. Such algorithm may include a sequence of more detailed operations, for example, formatting output of a selection algorithm as one or more tour itinerary files, and sending the files to a file storage subsystem that saves the files in a compute memory.

The apparatus 2000 may optionally include a processor module 2010 having at least one processor. The processor 2010 may be in operative communication with the modules 2002-2005 via a bus 2013 or similar communication coupling. In the alternative, one or more of the modules may be instantiated as functional modules in a memory of the processor. The processor 2010 may initialize and schedule the processes or functions performed by electrical components 2002-2005.

In related aspects, the apparatus 2000 may include a network interface module 2011 operable for communicating with system components over a computer network, or communicating with any external storage device, with external systems or servers, or connected vehicles over a computer network. A network interface 2011 module may be, or may include, for example, an Ethernet port or serial port (e.g., a Universal Serial Bus (USB) port), a Wi-Fi interface, or a cellular telephone interface. In further related aspects, the apparatus 2000 may optionally include a module for storing information, such as, for example, a memory device 2016. The computer readable medium or the memory module 2016 may be operatively coupled to the other components of the apparatus 2000 via the bus 2013 or the like. The memory module 2016 may be adapted to store computer readable instructions and data for effecting the processes and behavior of the modules 2002-2005, and subcomponents thereof, or the processor 2010, the method 1600 and one or more of the additional operations 1700-1900 disclosed herein, or any method for performance by an interactive media content output device (interactive media player) described herein. The memory module 2016 may retain instructions for executing functions associated with the modules 2002-2005 and any one or more of the operations described herein, for example in connection with one or more of FIGS. 5-19. While shown as being external to the memory 2016, it is to be understood that the modules 2002-2005 can exist within the memory 2016 or an on-chip memory of the processor 2010.

The apparatus 2000 may include a transceiver configured as a wireless transmitter/receiver, or a wired transmitter/receiver, for transmitting and receiving a communication signal to/from another system component such as, for example, an RFID tag or location information transmitter. In alternative embodiments, the processor 2010 may include networked microprocessors from devices operating over a computer network. In addition, the apparatus 2000 may include a stereoscopic display or other immersive display device for displaying immersive content, or other suitable output device. A stereoscopic display device may be, or may include, any suitable stereoscopic AR or VR output device as known in the art. The apparatus 2000 may include, or may be connected to, one or more biometric sensors 2014, which may be of any suitable types. Various examples of suitable biometric sensors are described herein above.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component or a module may be, but are not limited to being, a process running on a processor, a processor, an object, an executable, a thread of execution, a program, and/or a computer. By way of illustration, both an application running on a server and the server can be a component or a module. One or more components or modules may reside within a process and/or thread of execution and a component or module may be localized on one computer and/or distributed between two or more computers.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies, heads-up user interfaces, wearable interfaces, and/or mouse-and-keyboard type interfaces. Examples of such devices include VR output devices (e.g., VR headsets), AR output devices (e.g., AR headsets), computers (desktop and mobile), televisions, digital projectors, smart phones, personal digital assistants (PDAs), and other electronic devices both wired and wireless.

In addition, the various illustrative logical blocks, modules, and circuits described in connection with the aspects disclosed herein may be implemented or performed with any suitable hardware processor, including for example a general purpose processor, a digital signal processor (DSP), an application specific integrated circuit (ASIC), a field programmable gate array (FPGA) or other programmable logic device (PLD) or complex PLD (CPLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, digital versatile disk (DVD), Blu-Ray™, or any other form of computer-readable memory known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a client device or server. In the alternative, the processor and the storage medium may reside as discrete components in a client device or server.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips, or other format), optical disks (e.g., compact disk (CD), DVD, Blu-Ray™ or other format), smart cards, and flash memory devices (e.g., card, stick, or other formats). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A computer-implemented method for configuring a customized tour of a mapped space, the method comprising:
   providing, by one or more processors, an ordered arrangement of tour subject indicators configured for output by a user interface device, wherein each of the tour subject indicators is associated by an electronic data structure to a relevance value for one or more locations of the mapped space and to content about a subject indicated by the tour subject indicator for delivery at corresponding ones of the one or more locations, wherein the relevance value indicates a degree of relevance of each location of the one or more locations to the each of the tour subjects;

receiving, by the one or more processors from the user interface device, user selection data from a user indicating a lesser subset selected from the ordered arrangement of tour subject indicators;

calculating, by the one or more processors, an aggregate relevance score for the lesser subset of tour subject indicators and locations of the mapped space;

defining, by the one or more processors, at least one tour route record comprising an ordered list of locations being a lesser subset of all locations in the mapped space that satisfies at least a minimum aggregate relevance score constraint and a maximum tour duration constraint; and saving information defining the at least one tour route record in a computer memory for use in delivering a corresponding tour.

2. The method of claim 1, wherein the calculating further comprises aggregating edge values of a graph database linking the lesser subset of tour subject indicators to the locations of the mapped space, wherein nodes of the graph comprise the tour subject indicators.

3. The method of claim 1 further comprising, by the one or more processors, calculating an estimated tour duration based on the ordered list of locations, at least in part by summing estimated transit times between each location and estimated linger times at each location.

4. The method of claim 3, further comprising estimating, by the one or more processors, the estimated linger times at the each location at least in part based on a predetermined delivery period for the content for delivery at the each location.

5. The method of claim 1, wherein the defining further comprises the calculating the aggregate relevance score for each of alternative tour routes satisfying the minimum aggregate relevance score constraint and the maximum tour duration.

6. The method of claim 5, further comprising selecting, by the one or more processors, a selected route from the alternative tour routes based on the selected route having a greatest of aggregate relevance scores determined by the calculating.

7. The method of claim 1, wherein the defining further comprises generating the ordered list of locations in part by eliminating candidate locations for periods during which the candidate location is indicated as unavailable.

8. The method of claim 7, further comprising calculating, by the one or more processors, periods during which the candidate location is unavailable at least in part based on scheduled use of the location by one or more prior tours.

9. The method of claim 1, further comprising by the one or more processors for each of the tour subject indicators, weighting the relevance value by an interest factor indicating a user's level of interest in the indicated subject.

10. The method of claim 9, further comprising, by the one or more processors, determining the interest factor based on one or more of user input, prior user feedback for a cohort matching the user, or electronic data indicating user preferences.

11. The method of claim 9, further comprising, by the one or more processors, adjusting at least one of the relevance value or interest factor based on user feedback received during or after completing at least a portion of a tour following the tour route record.

12. The method of claim 9, further comprising tracking, by the one or more processors, progress of the user along the tour, at least in part by receiving a signal from a wireless transmitter progressing through the tour with the user.

13. The method of claim 10, further comprising modifying the at least one tour record during the tour, based at least in part on the user feedback.

14. The method of claim 10, further comprising receiving at least a portion of the user feedback as biometric data indicating a neurological response of the user to delivery of the content, from a biometric sensor positioned to detect the neurological response.

15. The method of claim 9, further comprising, by the one or more processors, processing the user feedback by a machine-learning algorithm trained to predict at least one of the interest factor or the relevance value for specific user cohorts.

16. The method of claim 1, further comprising generating an electronic tour guide for content corresponding to locations indicated by the at least one tour route record relevant to subjects referenced by the lesser subset selected from the ordered arrangement of tour subject indicators.

17. The method of claim 16, further comprising providing the electronic tour guide to at least one of a mobile device belonging to the user, or a mobile device belonging to a tour guide.

18. The method of claim 1 further comprising combining, by the one or more processors, two or more lesser subsets selected from the ordered arrangement of tour subject indicators each corresponding to a different user.

19. The method of claim 18 further comprising, by the one or more processors, selecting the two or more lesser subsets based on a similarity measure exceeding a threshold value.

20. The method of claim 18 further comprising, by the one or more processors, prioritizing tour subject indicators in the two or more lesser subsets for including in the at least one tour route record, at least in part by an algorithm that includes an equal number of unique tour subject indicators for each participating user.

21. An apparatus for configuring a customized tour of a mapped space, the apparatus comprising at least one processor coupled to a memory, the memory holding program instructions that when executed by the at least one processor cause the apparatus to perform:

providing an ordered arrangement of tour subject indicators configured for output by a user interface device, wherein each of the tour subject indicators is associated by an electronic data structure to a relevance value for one or more locations of the mapped space and to content about a subject indicated by the tour subject indicator for delivery at corresponding ones of the one or more locations, wherein the relevance value indicates a degree of relevance of each location of the one or more locations to the each of the tour subjects;

receiving user selection data from a user indicating a lesser subset selected from the ordered arrangement of tour subject indicators;

calculating an aggregate relevance score for the lesser subset of tour subject indicators and locations of the mapped space;

defining at least one tour route record comprising an ordered list of locations being a lesser subset of all locations in the mapped space that satisfies at least a minimum aggregate relevance score constraint and a maximum tour duration constraint; and saving information defining the at least one tour route record in the memory for use in delivering a corresponding tour.

22. The apparatus of claim 21, wherein the memory holds further instructions for performing the calculating at in part by aggregating edge values of a graph database linking the lesser subset of tour subject indicators to the locations of the mapped space, wherein nodes of the graph comprise the tour subject indicators.

23. The apparatus of claim 21, wherein the memory holds further instructions for calculating an estimated tour duration based on the ordered list of locations, at least in part by summing estimated transit times between each location and estimated linger times at each location.

24. The apparatus of claim 23, wherein the memory holds further instructions for estimating the estimated linger times at the each location at least in part based on a predetermined delivery period for the content for delivery at the each location.

25. The apparatus of claim 21, wherein the memory holds further instructions for performing the defining at least in part by calculating the aggregate relevance score for each of alternative tour routes satisfying the minimum aggregate relevance score constraint and the maximum tour duration.

26. The apparatus of claim 25, wherein the memory holds further instructions for selecting a selected route from the alternative tour routes based on the selected route having a greatest of aggregate relevance scores determined by the calculating.

27. The apparatus of claim 21, wherein the memory holds further instructions for the defining at least in part by eliminating candidate locations from the ordered list of locations for periods during which the candidate location is indicated as unavailable.

28. The apparatus of claim 27, wherein the memory holds further instructions for calculating periods during which the candidate location is unavailable at least in part based on scheduled use of the location by one or more prior tours.

29. The apparatus of claim 21, wherein the memory holds further instructions for weighting, for each of the tour subject indicators, the relevance value by an interest factor indicating a user's level of interest in the indicated subject.

30. The apparatus of claim 29, wherein the memory holds further instructions for determining the interest factor based on one or more of user input, prior user feedback for a cohort matching the user, or electronic data indicating user preferences.

31. The apparatus of claim 29, wherein the memory holds further instructions for adjusting at least one of the relevance value or interest factor based on user feedback received during or after completing at least a portion of a tour following the tour route record.

32. The apparatus of claim 29, wherein the memory holds further instructions for tracking progress of the user along the tour, at least in part by receiving a signal from a wireless transmitter progressing through the tour with the user.

33. The apparatus of claim 30, wherein the memory holds further instructions for modifying the at least one tour record during the tour, based at least in part on the user feedback.

34. The apparatus of claim 30, wherein the memory holds further instructions for receiving at least a portion of the user feedback as biometric data indicating a neurological response of the user to delivery of the content, from a biometric sensor positioned to detect the neurological response.

35. The apparatus of claim 29, wherein the memory holds further instructions for processing the user feedback by a machine-learning algorithm trained to predict at least one of the interest factor or the relevance value for specific user cohorts.

36. The apparatus of claim 21, wherein the memory holds further instructions for generating an electronic tour guide for content corresponding to locations indicated by the at least one tour route record relevant to subjects referenced by the lesser subset selected from the ordered arrangement of tour subject indicators.

37. The apparatus of claim 36, wherein the memory holds further instructions for providing the electronic tour guide to at least one of a mobile device belonging to the user, or a mobile device belonging to a tour guide.

38. The apparatus of claim 21, wherein the memory holds further instructions for combining two or more lesser subsets selected from the ordered arrangement of tour subject indicators each corresponding to a different user.

39. The apparatus of claim 38, wherein the memory holds further instructions for selecting the two or more lesser subsets based on a similarity measure exceeding a threshold value.

40. The apparatus of claim 38, wherein the memory holds further instructions for, prioritizing tour subject indicators in the two or more lesser subsets for including in the at least one tour route record, at least in part by an algorithm that provides each participating user with equal consideration in selection of unique tour subject indicators.

41. An apparatus for configuring a customized tour of a mapped space, the apparatus comprising:
- means for providing an ordered arrangement of tour subject indicators configured for output by a user interface device, wherein each of the tour subject indicators is associated by an electronic data structure to a relevance value for one or more locations of the mapped space and to content about a subject indicated by the tour subject indicator for delivery at corresponding ones of the one or more locations, wherein the relevance value indicates a degree of relevance of each location of the one or more locations to the each of the tour subjects;
- means for receiving user selection data from a user indicating a lesser subset selected from the ordered arrangement of tour subject indicators;
- means for calculating an aggregate relevance score for the lesser subset of tour subject indicators and locations of the mapped space;
- means for defining at least one tour route record comprising an ordered list of locations being a lesser subset of all locations in the mapped space that satisfies at least a minimum aggregate relevance score constraint and a maximum tour duration constraint; and
- means for saving information defining the at least one tour route record in the memory for use in delivering a corresponding tour.

\* \* \* \* \*